United States Patent
Saito et al.

(10) Patent No.: US 9,069,589 B2
(45) Date of Patent: Jun. 30, 2015

(54) VIRTUAL COMPUTER SYSTEM, VIRTUAL COMPUTER CONTROL METHOD AND ACCUMULATION CIRCUIT

(75) Inventors: Masahiko Saito, Osaka (JP); Ryota Miyazaki, Osaka (JP); Tadao Tanikawa, Osaka (JP); Katsushige Amano, Kyoto (JP); Masashi Sugiyama, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 322 days.

(21) Appl. No.: 13/702,163
(22) PCT Filed: Jun. 27, 2011
(86) PCT No.: PCT/JP2011/003662
§ 371 (c)(1),
(2), (4) Date: Dec. 5, 2012
(87) PCT Pub. No.: WO2012/004948
PCT Pub. Date: Jan. 12, 2012

(65) Prior Publication Data
US 2013/0081016 A1    Mar. 28, 2013

(30) Foreign Application Priority Data
Jul. 6, 2010    (JP) ................. 2010-154068

(51) Int. Cl.
*G06F 1/26* (2006.01)
*G06F 1/32* (2006.01)
(Continued)

(52) U.S. Cl.
CPC .............. *G06F 9/455* (2013.01); *G06F 1/3287* (2013.01); *G06F 1/26* (2013.01); *G06F 9/5094* (2013.01);
(Continued)

(58) Field of Classification Search
None
See application file for complete search history.

(56) References Cited

U.S. PATENT DOCUMENTS 7,441,135 B1    10/2008    Chan et al.
2004/0107273 A1    6/2004    Biran et al.
(Continued)

FOREIGN PATENT DOCUMENTS

| JP | 2004-192612 | 7/2004 |
|---|---|---|
| JP | 2006-508445 | 3/2006 |

(Continued)

OTHER PUBLICATIONS

Burd et al. A Dynamic Voltage Scaled Microprocessor System. [online] (Jun. 17, 2000). IEEE., pp. 1571-1580. Retrieved From the Internet <http://web.stanford.edu/class/archive/ee/ee371/ee371.1066/handouts/burd_00.pdf>.*

(Continued)

*Primary Examiner* — Emerson Puente
*Assistant Examiner* — Jonathan R Labud
(74) *Attorney, Agent, or Firm* — Wenderoth, Lind & Ponack, L.L.P.

(57) ABSTRACT

The present invention relates to a virtual machine system that includes a plurality of processors and executes a plurality of virtual machines in parallel with use of the plurality of processors. An aim thereof is to suppress power consumption without sacrificing the performance of the virtual machine system. When there are at least two processors that do not have any virtual machines allocated thereto, one of the at least two processors is supplied with power so as to be placed in a standby state, and a remaining one or more of the at least two processors are not supplied with power.

12 Claims, 35 Drawing Sheets

(51) Int. Cl.
*G06F 9/455* (2006.01)
*G06F 9/50* (2006.01)

(52) U.S. Cl.
CPC ............ *Y02B 60/1282* (2013.01); *Y02B 60/142* (2013.01); *G06F 9/45558* (2013.01); *G06F 2009/4557* (2013.01)

(56) References Cited

U.S. PATENT DOCUMENTS

| | | |
|---|---|---|
| 2004/0111596 A1 | 6/2004 | Rawson, III |
| 2006/0085794 A1 | 4/2006 | Yokoyama |
| 2007/0130341 A1 | 6/2007 | Ma |
| 2009/0106409 A1 | 4/2009 | Murata |
| 2009/0150896 A1 | 6/2009 | Tsushima et al. |

FOREIGN PATENT DOCUMENTS

| | | |
|---|---|---|
| JP | 2006-113767 | 4/2006 |
| JP | 2007-323244 | 12/2007 |
| JP | 2009-116852 | 5/2009 |
| JP | 2009-140157 | 6/2009 |
| JP | 2009-237859 | 10/2009 |

OTHER PUBLICATIONS

Extended European Search Report issued Nov. 7, 2013 in corresponding European Application No. 11803289.5.
International Search Report issued Sep. 27, 2011 in International (PCT) Application No. PCT/JP2011/003662.

* cited by examiner

FIG. 5

| | 501 | | 502 | | 503 |
|---|---|---|---|---|---|
| Virtual machine ID | | No. of tasks | | Processor ID | |
| Virtual machine A | | 20 | | Processor A | |
| Virtual machine B | | 15 | | Processor A | |
| Virtual machine C | | 5 | | Processor A | |
| Virtual machine D | | 35 | | Processor C | |

| Processor ID | Attribute | No. of virtual machines |
|---|---|---|
| Processor A | Share | 3 |
| Processor B | Standby | 0 |
| Processor C | Exclusive | 1 |
| Processor D | Off | 0 |

FIG. 13

| Virtual machine ID /501 | No. of tasks /502 | Processor ID /503 |
|---|---|---|
| Virtual machine A | 20 | Processor A |
| Virtual machine B | 15 | Processor A |
| Virtual machine C | 5 | Processor A |

FIG. 14

| Processor ID | Attribute | No. of virtual machines |
|---|---|---|
| Processor A | Share | 3 |
| Processor B | Standby | 0 |
| Processor C | Off | 0 |
| Processor D | Off | 0 |

| Virtual machine ID ~501 | No. of tasks ~502 | Processor ID ~503 |
|---|---|---|
| Virtual machine A | 20 | Processor A |
| Virtual machine B | 15 | Processor A |
| Virtual machine C | 40 | Processor A |

FIG. 17

| Processor ID | Attribute | No. of virtual machines |
|---|---|---|
| Processor A | Share | 2 |
| Processor B | Exclusive | 1 |
| Processor C | Standby | 0 |
| Processor D | Off | 0 |

| Virtual machine ID ~2301 | No. of tasks ~2302 | Processor ID ~2303 |
|---|---|---|
| Virtual machine A | 20 | Power saving processor A |
| Virtual machine B | 15 | Power saving processor B |
| Virtual machine C | 5 | Power saving processor C |

FIG. 33

| Processor ID ~2401 | Attribute ~2402 |
|---|---|
| Power saving processor A | Active |
| Power saving processor B | Active |
| Power saving processor C | Standby |
| High-performance processor A | Active |
| High-performance processor B | Standby |
| High-performance processor C | Off |

VIRTUAL COMPUTER SYSTEM, VIRTUAL COMPUTER CONTROL METHOD AND ACCUMULATION CIRCUIT

TECHNICAL FIELD

The present invention relates to a virtual machine system that executes a plurality of virtual machines in parallel.

BACKGROUND OF INVENTION

[Background Art]

Conventionally, a virtual machine system is known that includes a plurality of processors and executes a plurality of virtual machines in parallel with use of the processors (see Patent Literature 1).

In such a virtual machine system, each virtual machine is allocated to one or more processors and is then executed.

If the number of processors is larger than the number of virtual machines, the virtual machines may not be allocated to some of the processors.

Also, as a technique for reducing power consumption in a virtual machine system including a plurality of processors, techniques disclosed in Patent Literatures 2 and 3 are conventionally known.

According to the technique in Patent Literature 2, if a virtual machine is not allocated to any of the processors in a virtual machine system, a power supply to the processor is cut off. According to the technique in Patent Literature 3, if a virtual machine is not allocated to any of the processors in a virtual machine system, the processor is placed in a sleep state.

CITATION LIST

Patent Literature

[Patent Literature 1]
  Japanese Patent Application Publication No. 2006-113767
[Patent Literature 2]
  Japanese Patent Application Publication No. 2004-192612
[Patent Literature 3]
  Japanese Patent Application Publication No. 2009-140157

SUMMARY OF INVENTION

Generally, in order to activate a processor to which a power supply has been cut off, a few milliseconds to a few tens of milliseconds are required for the processor to be able to perform processing stably.

In the technique disclosed in Patent Literature 2, in order to newly allocate virtual machines to processors that do not have any virtual machines allocated thereto, these processors need to be activated first.

This means that in the case of newly allocating virtual machines to processors that do not have any virtual machines allocated thereto, a few milliseconds to a few tens of milliseconds are generally required from activation of the processors to start of processing by the activated processors. This degrades the performance of the virtual machine system.

In the technique disclosed in Patent Literature 3, processors that do not have any virtual machines allocated thereto are placed in a sleep state until virtual machines are newly allocated to the processors.

The processors in a sleep state cannot perform processing pertaining to virtual machines. Even so, the processors in a sleep state still consume a constant amount of power, although the amount is small as compared to the power consumption in a normal operation state.

Accordingly, an increase in the number of processors that do not have any virtual machines allocated thereto causes an increase in the power consumption by these processors, which do not perform the processing pertaining to virtual machines.

The present invention has been achieved in view of the above problem, and an aim thereof is to provide a virtual machine system that suppresses power consumption while preventing degradation of the performance of the virtual machine system.

In order to solve the above problem, one aspect of the present invention is a virtual machine system including a plurality of processors and for causing a plurality of virtual machines to operate, the virtual machine system comprising: an allocation unit configured to allocate each virtual machine to any processor that is supplied with power; and a power supply unit configured to, when the allocation unit allocates a virtual machine to a processor that is supplied with power and does not have any virtual machine allocated thereto, and at least two processors are not supplied with power, supply power to at least one and less than all of the processors that are not supplied with power, and maintain a remaining one or more of the processors that are not supplied with power at a state of not being supplied with power.

According to the virtual machine system having the above structure, the following control is possible when the allocation unit allocates a virtual machine to a processor that is supplied with power and does not have any virtual machines allocated thereto. That is, in preparation for the next time a virtual machine is newly allocated to a processor, the power supply unit can supply power to a processor that is not supplied with power so as to cause the processor to be placed in a standby state.

Furthermore, among processors that do not have any virtual machines allocated thereto, processors other than the processor in the standby state for the next allocation of a virtual machine are not supplied with power.

This makes it possible to suppress power consumption while preventing degradation of the performance of the virtual machine system.

BRIEF DESCRIPTION OF DRAWINGS

FIG. 5 shows the data structure of virtual machine information.

FIG. 13 shows the data structure of virtual machine information.

FIG. 14 shows the data structure of processor information.

FIG. 16 shows the data structure of virtual machine information.

FIG. 17 shows the data structure of processor information.

FIG. 23 shows the data structure of virtual machine information.

FIG. 33 shows the data structure of processor information.

DETAILED DESCRIPTION OF INVENTION

<Embodiment 1>
<Outline>

As an embodiment of a virtual machine system according to the present invention, the following describes a virtual machine system that includes four processors and executes a plurality of virtual machines in parallel with use of these processors.

This virtual machine system performs the following control when some of the processors do not have any virtual machines allocated thereto. That is, in preparation for the next time a virtual machine is newly allocated to a processor, the virtual machine system supplies power to one of the processors that do not have any virtual machines allocated thereto so as to place the processor to be in a standby state, and does not supply power to the rest of the processors that do not have any virtual machines allocated thereto.

With reference to the drawings, the following describes the structure of a virtual machine system according to Embodiment 1.

Figure 1:
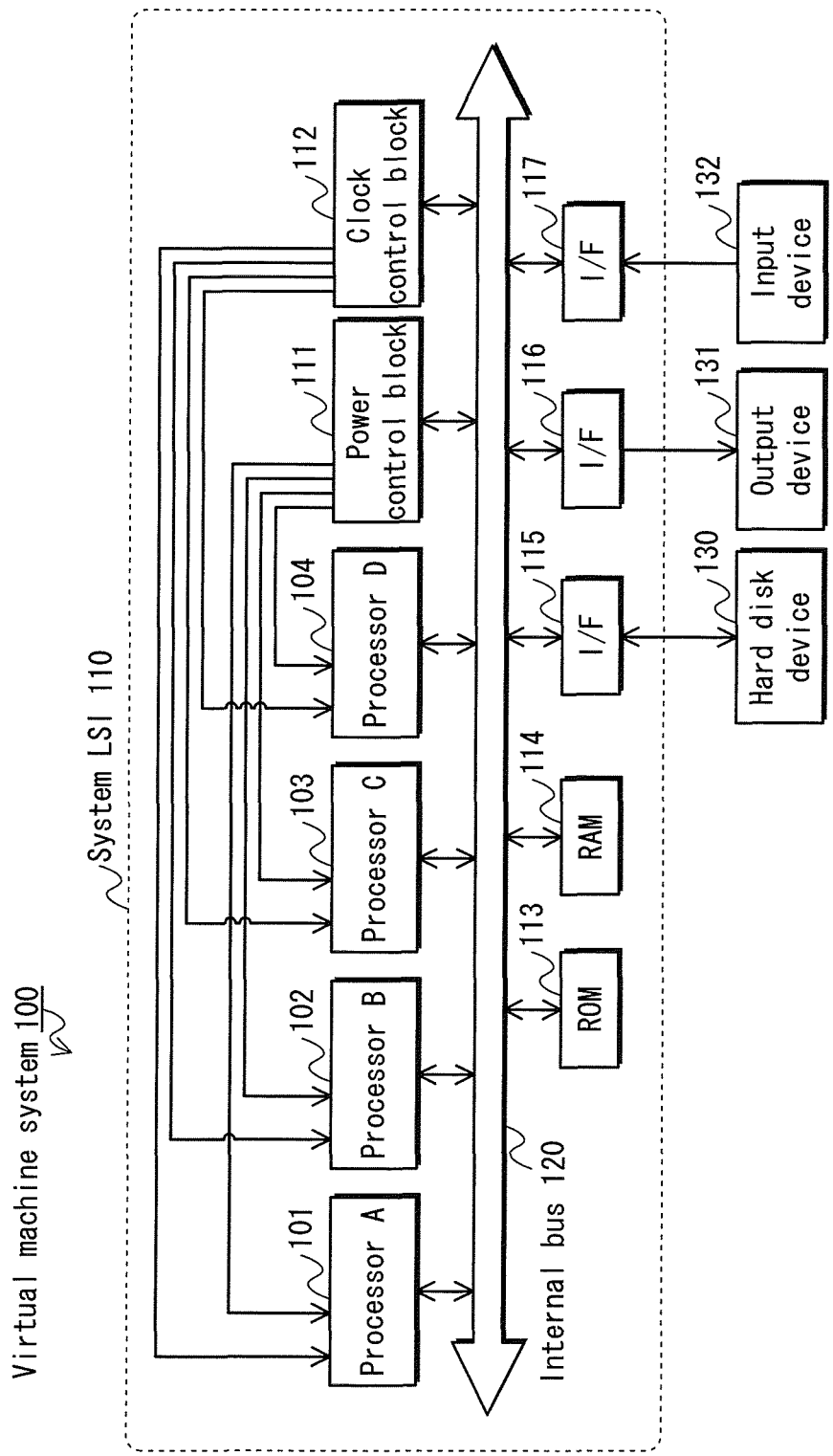
FIG. 1 is a block diagram showing the main hardware structure of a virtual machine system 100.

FIG. 1 is a block diagram showing the main hardware structure of a virtual machine system 100.

As shown in FIG. 1, the virtual machine system 100 includes a system LSI (Large Scale Integration) 110, a hard disk device 130, an output device 131, and an input device 132.

The system LSI 110 is an integrated circuit in which are integrated the following: a processor A 101, a processor B 102, a processor C 103, a processor D 104, a power control block 111, a clock control block 112, a ROM (Read Only Memory) 113, a RAM (Random Access Memory) 114, a hard disk device interface 115, an output device interface 116, an input device interface 117, and an internal bus 120. The system LSI 110 is connected to the hard disk device 130, the output device 131, and the input device 132.

Each of the processors A 101 to D 104 is connected to the internal bus 120, the power control block 111, and the clock control block 112, executes a program stored in any of the ROM 113, the RAM 114, and the hard disk device 130 to control the power control block 111, the clock control block 112, the ROM 113, the RAM 114, the hard disk device 130, the output device 131, and the input device 132, thereby realizing various functions.

The processors A 101 to D 104 have the same functions and operate in two different modes, i.e., a normal operation mode and a power saving mode. In the normal operation mode, the processors A 101 to D 104 operate with a supply voltage of 1.2 V and an operating frequency of 1 GHz. In the power saving mode, the processors A 101 to D 104 operate with a supply voltage of 1.0 V and an operating frequency of 500 MHz.

Also, the processors A 101 to D 104 are activated when the voltage of a power supply is changed from 0 V to at least 1.0 V and a clock signal is supplied to the processors A 101 to D 104.

The power control block 111 is connected to the internal bus 120 and the processors A 101 to D 104, and is controlled by any of the processors A 101 to D 104. The power control block 111 switches the voltage of power supply to the processors A 101 to D 104.

Figure 2:
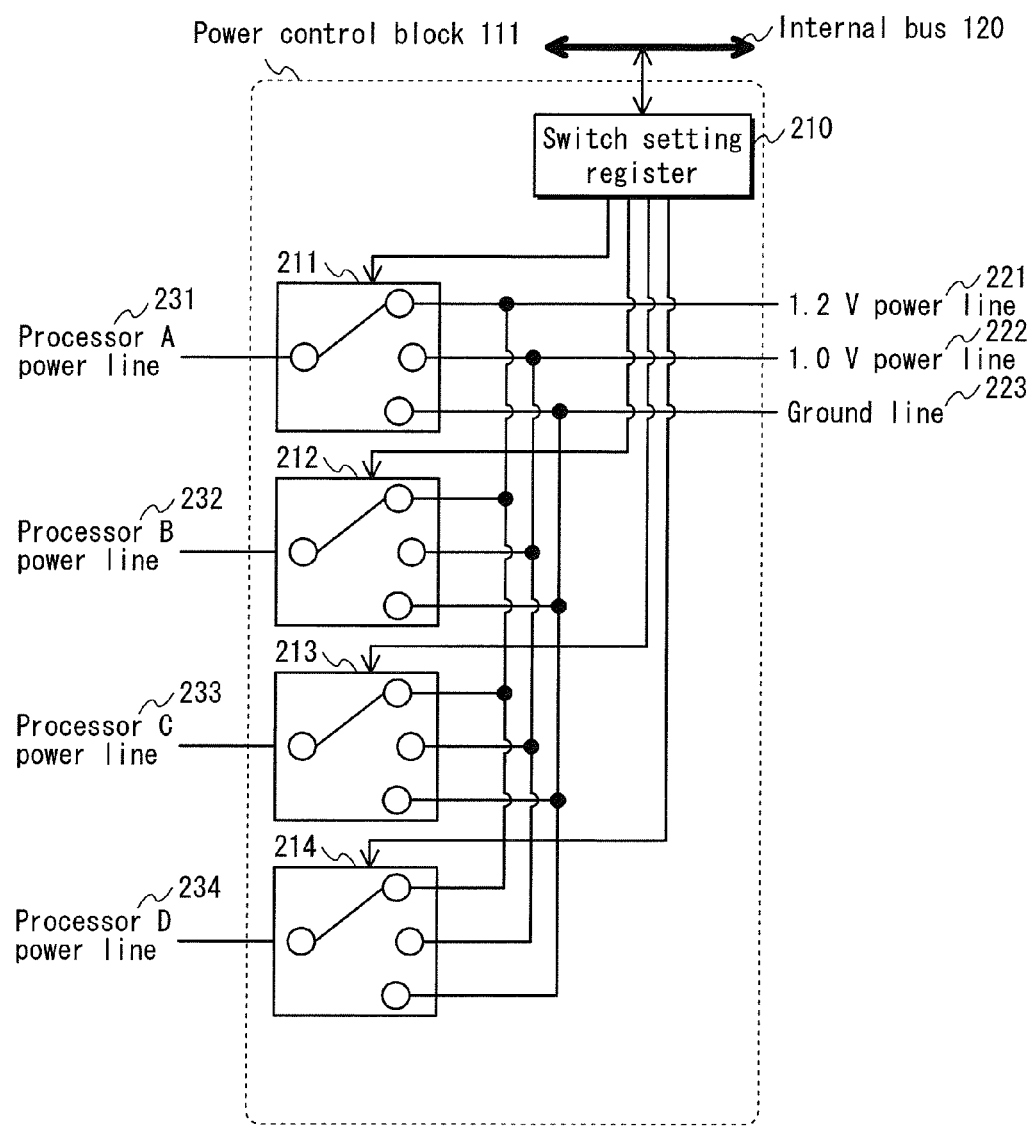
FIG. 2 is a block diagram showing the main hardware structure of a power control block 111.

FIG. 2 is a block diagram showing the main hardware structure of the power control block 111.

As shown in FIG. 2, the power control block 111 includes a switch setting register 210, and power switches 211, 212, 213, and 214.

The switch setting register 210 is connected to the internal bus 120 and the power switches 211 to 214. The switch setting register 210 is an 8-bit register into which any of the processors A 101 to D 104 writes a value.

The power switch 211 is connected to the switch setting register 210, a 1.2 V power line 221 for supplying a voltage of 1.2 V, a 1.0 V power line 222 for supplying a voltage of 1.0 V, a ground line 223 for supplying a voltage of 0 V, and a processor A power line 231 for supplying voltage to the processor A 101. The power switch 211 selects one of three lines, i.e., the 1.2 V power line 221, the 1.0 V power line 222, and the ground line 223, according to the values written in the zeroth bit and the first bit of the switch setting register 210, and electrically connects the selected line to the processor A power line 231.

The power switches 212 to 214 have a similar structure to the power switch 211.

The power switch 212 selects a line according to the values written in the second bit and the third bit of the switch setting register 210, and electrically connects the selected line to a processor B power line 232, which is a power line for supplying voltage to the processor B 102. The power switch 213 selects a line according to the values written in the fourth bit and the fifth bit of the switch setting register 210, and electrically connects the selected line to a processor C power line 233, which is a power line for supplying voltage to the processor C 103. The power switch 214 selects a line according to the values written in the sixth bit and the seventh bit of the switch setting register 210, and electrically connects the selected line to a processor D power line 234, which is a power line for supplying voltage to the processor D 104.

In the case where the virtual machine system 100 is reset, an initial value is assigned to the switch setting register 210, whereby the power control block 111 supplies a voltage of 1.2 V to the processor A 101, a voltage of 1.0 V to the processor B 102, and a voltage of 0 V to the processors C 103 and D 104.

Returning again to FIG. 1, description of the main hardware structure of the virtual machine system 100 continues.

The clock control block 112 is connected to the internal bus 120 and the processors A 101 to D 104, and is controlled by any of the processors A 101 to D 104. The clock control block 112 switches the frequency of a clock signal to be supplied to the processors A 101 to D 104.

Figure 3:
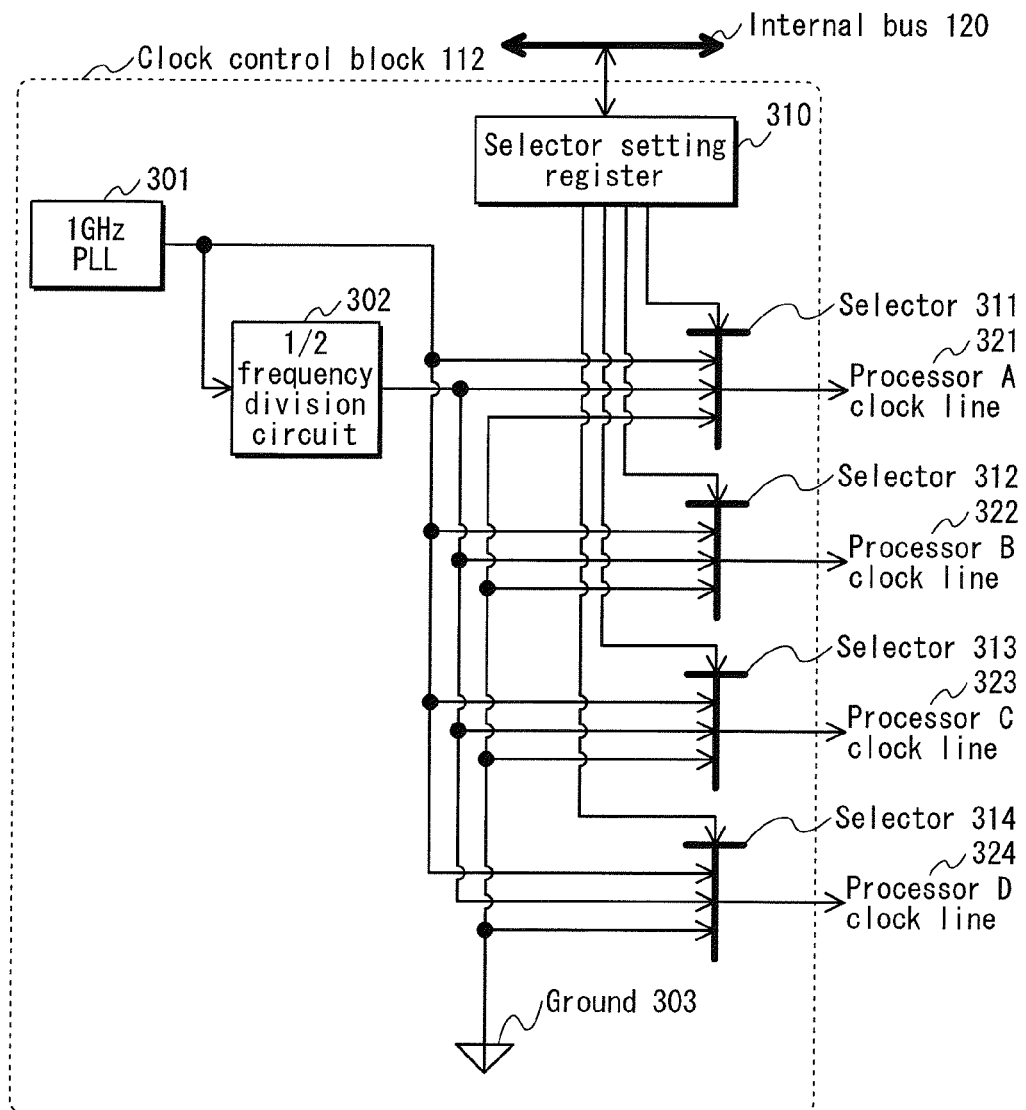
FIG. 3 is a block diagram showing the structure of a clock control block 112.

FIG. 3 shows the main hardware structure of the clock control block 112.

As shown in FIG. 3, the clock control block 112 includes a selector setting register 310, a 1 GHz PLL (Phase Locked Loop) 301, a ½ frequency division circuit 302, a selector 311, a selector 312, a selector 313, and a selector 314.

The selector setting register 310 is connected to the internal bus 120 and the selectors 311 to 314. The selector setting register 310 is an 8-bit register into which any of the processors A 101 to D 104 writes a value.

The 1 GHz PLL 301 is connected to the ½ frequency division circuit 302 and the selectors 311 to 314. The 1 GHz PLL 301 generates and outputs a clock signal having a frequency of 1 GHz.

The ½ frequency division circuit 302 is connected to the 1 GHz PLL 301 and the selectors 311 to 314. The ½ frequency division circuit 302 divides by two a clock signal having a frequency of 1 GHz input thereto, and outputs a clock signal having a frequency of 500 MHz.

The selector 311 is connected to the selector setting register 310, the 1 GHz PLL 301, the ½ frequency division circuit 302, a ground 303, and a processor A clock line 321 for supplying a clock signal to the processor A 101. The selector 311 selects one of three clock signals, i.e., a clock signal having a frequency of 1 GHz, a clock signal having a frequency of 500 MHz, and a clock signal having a frequency of 0 Hz, according to the values written in the zeroth bit and the first bit of the selector setting register 310, and outputs the selected clock signal to the processor A 101 via the processor A clock line 321.

The selectors 312 to 314 have a similar structure to the selector 311.

The selector 312 selects a clock signal according to the values written in the second bit and the third bit of the selector setting register 310, and outputs the selected clock signal to the processor B 102 via a processor B clock line 322. The selector 313 selects a clock signal according to the fourth bit and the fifth bit of the selector setting register 310, and outputs the selected clock signal to the processor C 103 via a processor C clock line 323. The selector 314 selects a clock signal according to the values of the sixth bit and the seventh bit of the selector setting register 310, and outputs the selected clock signal to the processor D 104 via a processor D clock line 324.

In the case where the virtual machine system 100 is reset, an initial value is assigned to the selector setting register 310, whereby the clock control block 112 outputs a clock signal of 1 GHz to the processor A 101, a clock signal of 500 MHz to the processor B 102, a clock signal of 0 Hz to each of the processors C 103 and D 104.

Returning again to FIG. 1, description of the main hardware structure of the virtual machine system 100 continues.

The ROM 113 is connected to the internal bus 120, and stores a program defining the operations of the processors A 101 to D 104, along with data used by the processors A 101 to D 104.

The RAM 114 is connected to the internal bus 120, and temporarily stores a program defining the operations of the processors A 101 to D 104, along with data generated as a result of the processors A 101 to D 104 executing the program.

The hard disk device interface 115, the output device interface 116, and the input device interface 117 are connected to the internal bus 120, and respectively have a function to act as an interface for the exchange of signals between the internal bus 120 and the hard disk device 130, between the internal bus 120 and the output device 131, and between the internal bus 120 and the input device 132.

The internal bus 120 is connected to the processors A 101 to D 104, the power control block 111, the clock control block 112, the ROM 113, the RAM 114, the hard disk device interface 115, the output device interface 116, and the input device interface 117. The internal bus 120 transmits signals between the circuits connected thereto.

The hard disk device 130 is connected to the hard disk device interface 115, and is controlled by any of the processors A 101 to D 104. The hard disk device 130 writes data onto an internal hard disk and reads data written on the internal hard disk.

The output device 131 is connected to the output device interface 116, and is controlled by any of the processors A 101 to D 104. The output device 131 displays a character string, etc., via an internal display.

The input device 132 is connected to the input device interface 117, and is controlled by any of the processors A 101 to D 104. The input device 132 receives an operation command from a user via a keyboard, a mouse, etc., that are attached to the input device 132, and transmits the received operation command to any of the processors A 101 to D 104.

The aforementioned virtual machine system 100 realizes various functions by any of the processors A 101 to D 104 executing a program stored in any of the ROM 113, the RAM 114, and the hard disk device 130.

The following describes the functions of the virtual machine system 100 realized by the aforementioned hardware, with reference to the drawings.

Figure 4:
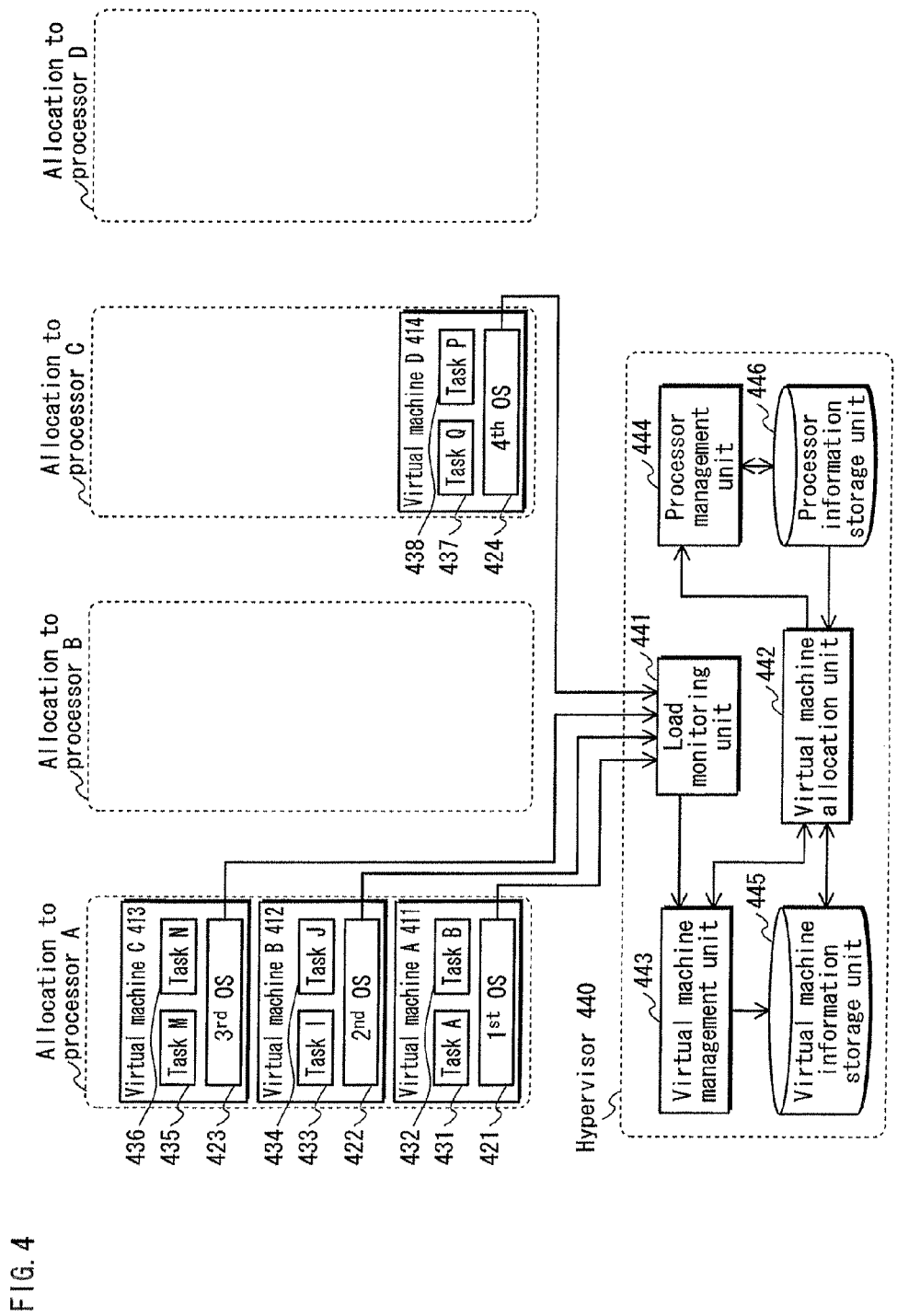
FIG. 4 is a functional structure diagram showing the main functional blocks constituting the virtual machine system 100.

FIG. 4 is a functional structure diagram showing the main functional blocks constituting the virtual machine system 100, in a state where three virtual machines are allocated to the processor A 101 and one virtual machine is allocated to the processor C 103.

As shown in FIG. 4, the virtual machine system 100 includes a hypervisor 440 and a plurality of virtual machines (virtual machines A 411, B 412, C 413, and D 414 in the present example).

The virtual machine A 411 is realized in the virtual machine system 100, and a first OS (Operating System) 421, a task A 431, and a task B 432 operate in the virtual machine A 411. In the present example, the virtual machine A 411 is allocated to the processor A 101 and operates therein.

The virtual machine B 412 is realized in the virtual machine system 100, and a second OS 422, a task I 433, and a task J 434 operate in the virtual machine B 412. In the present example, the virtual machine B 412 is allocated to the processor A 101 and operates therein.

The virtual machine C 413 is realized in the virtual machine system 100, and a third OS 423, a task M 435, and a task N 436 operate in the virtual machine C 413. In the present example, the virtual machine C 413 is allocated to the processor A 101 and operates therein.

The virtual machines A 411, B 412, and C 413 are realized by the processor A 101 repeatedly and sequentially performing processing pertaining to each of the virtual machines by time sharing.

The virtual machine D 414 is realized in the virtual machine system 100, and a fourth OS 424, a task P 437, and a task Q 438 operate in the virtual machine D 414. In the present example, the virtual machine D 414 is allocated to the processor C 103 and operates therein.

The hypervisor 440 includes a load monitoring unit 441, a virtual machine allocation unit 442, a virtual machine management unit 443, a processor management unit 444, a virtual machine information storage unit 445, and a processor information storage unit 446. The hypervisor 440 is software having a higher privilege level than each OS.

The load monitoring unit 441 is connected to each OS operating in a corresponding virtual machine, and to the virtual machine management unit 443. The load monitoring unit 441 has a function as a timer that measures the passage of time, and also has a function of acquiring from each OS, for each predetermined interval T1 (such as 100 μs), the number of tasks existing in a task queue managed by the OS, and of outputting to the virtual machine management unit 443, for each OS, a pair of (i) a task count information piece indicating the number of tasks acquired from the OS and (ii) a virtual machine ID for identifying a virtual machine in which the OS operates.

The virtual machine management unit 443 is connected to the load monitoring unit 441, the virtual machine allocation unit 442, and the virtual machine information storage unit 445, and has the following four functions.

Function 1: At the start up of the hypervisor 440, the virtual machine management unit 443 generates virtual machine information such that all of the virtual machines targeted for execution are associated with the processor A 101, and stores the virtual machine information thus generated into the virtual machine information storage unit 445.

Function 2: Upon receiving, from the load monitoring unit 441, pairs of task count information pieces and virtual machine IDs, the virtual machine management unit 443 updates the virtual machine information stored in the virtual machine information storage unit 445, based on the pairs of task count information pieces and virtual machine IDs thus received.

Function 3: When the following conditions are satisfied: (i) the virtual machine management unit 443 has updated the virtual machine information stored in the virtual machine information storage unit 445 based on the pairs of the task count information pieces and the virtual machine IDs received from the load monitoring unit 441; and (ii) the number of tasks before updating is different from the number of tasks after updating in regard to any of the task count information pieces, the virtual machine management unit 443 outputs, to the virtual machine allocation unit 442, the virtual machine ID corresponding to the task count information piece indicating a different number of tasks before and after updating.

Function 4: Upon receiving pairs of virtual machine IDs and processor IDs from the virtual machine allocation unit 442, the virtual machine management unit 443 updates the virtual machine information stored in the virtual machine information storage unit 445, based on the pairs of the virtual machine IDs and the processor IDs thus received.

FIG. 5 shows the data structure of the virtual machine information generated by the virtual machine management unit 443 and stored in the virtual machine information storage unit 445.

As shown in FIG. 5, the virtual machine information indicates virtual machine IDs 501, the numbers of tasks 502, and processor IDs 503 that are associated with each other.

Each virtual machine ID 501 is information for identifying a virtual machine.

Each of the numbers of tasks 502 is information indicating the number of tasks existing in a task queue managed by an OS, the OS operating in a virtual machine identified by a corresponding virtual machine ID.

Each of the processor IDs 503 is information for identifying a processor in which a virtual machine identified by a corresponding virtual machine ID operates.

Returning again to FIG. 4, description of the functional structure of the virtual machine system 100 continues.

The virtual machine information storage unit 445 is connected to the virtual machine management unit 443 and the virtual machine allocation unit 442. The virtual machine information storage unit 445 is a memory area for storing the virtual machine information, and is implemented as a portion of the area of the RAM 114.

The processor management unit 444 is connected to the virtual machine allocation unit 442 and the processor information storage unit 446, and has the following three functions.

Function 1: At the start up of the hypervisor 440, the processor management unit 444 generates processor information such that: the attribute of the processor A 101 is "share" (described below); the attribute of the processor B 102 is "standby"; the attribute of each of the processors C 103 and D 104 is "off"; the number of virtual machines associated with the processor A 101 is the total number of virtual machines targeted for execution; and the number of virtual machines associated with each of the processors B 102, C 103, and D 104 is "0" which is an initial value, and stores the processor information thus generated into the processor information storage unit 446.

Function 2: Upon receiving a pair of a processor ID and an attribute, the processor management unit 444 updates the processor information stored in the processor information storage unit 446 based on the pair of the processor ID and the attribute thus received.

Function 3: The processor management unit 444 supplies a clock signal and a supply voltage to each processor, based on the processor information stored in the processor information storage unit 446.

Figure 6:
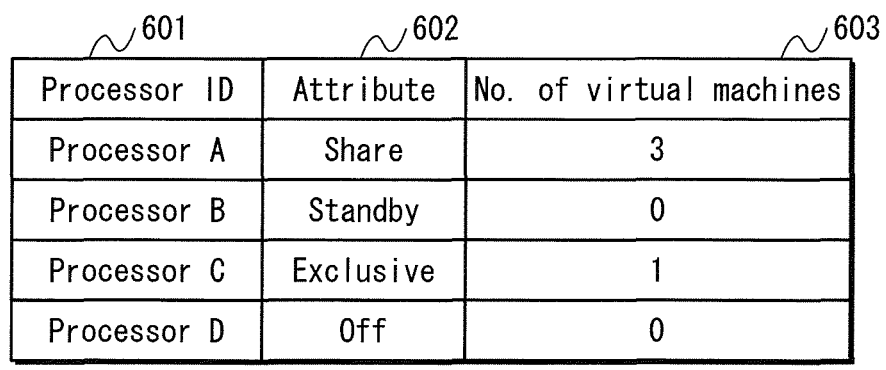
FIG. 6 shows the data structure of processor information.

FIG. 6 shows the data structure of the processor information generated by the processor management unit 444 and stored in the processor information storage unit 446.

As shown in FIG. 6, the processor information indicates processor IDs 601, attributes 602, and the numbers of virtual machines 603 that are associated with each other.

Each of the processor IDs 601 is information for identifying a processor.

Each of the attributes 602 is information indicating the attribute of a processor identified by a corresponding processor ID.

Each of the processors A 101 to D 104 is associated with one of four attributes, i.e., "exclusive", "share", "standby", and "off".

The attribute of "exclusive" indicates that the processor operates in the normal operation mode in which the supply voltage is 1.2 V and the operating frequency is 1 GHz, and the number of virtual machines operating on the processor is limited to one.

The attribute of "share" indicates that the processor operates in the normal operation mode in which the supply voltage is 1.2 V and the operating frequency is 1 GHz, and the number of virtual machines operating on the processor is equal to or greater than one.

When the number of virtual machines operating on the processor having the attribute of "share" is greater than one, the processor causes the virtual machines to operate by time sharing.

The attribute of "standby" indicates that the processor operates in the power saving mode in which the supply voltage is 1.0 V and the operating frequency is 500 MHz, and no virtual machine operates on the processor.

The attribute of "off" indicates that the processor is not in operation, i.e., the processor is supplied with a supply voltage of 0 V.

Each of the numbers of virtual machines 603 is information indicating the number of virtual machines operating on a processor identified by a corresponding processor ID.

Returning again to FIG. 4, description of the functional structure of the virtual machine system 100 continues.

The processor information storage unit 446 is connected to the processor management unit 444. The processor information storage unit 446 is a memory area for storing the processor information, and is implemented as a portion of the area of the RAM 114.

The virtual machine allocation unit 442 is connected to the virtual machine management unit 443, the processor management unit 444, the virtual machine information storage unit 445, and the processor information storage unit 446, and has the following four functions.

Function 1: The virtual machine allocation unit 442 changes the attribute of a processor based on: the virtual machine information stored in the virtual machine information storage unit 445; and the processor information stored in the processor information storage unit 446.

Function 2: When having changed the attribute of a processor, the virtual machine allocation unit 442 outputs, to the processor management unit 444, a pair of a processor ID for identifying the processor whose attribute has been changed and a new attribute after the attribute has been changed.

Function 3: The virtual machine allocation unit 442 moves the virtual machine operating on a processor to another processor, based on the virtual machine information stored in the virtual machine information storage unit 445, and causes the virtual machine to operate on the other processor to which the virtual machine has been moved.

Function 4: When having moved a virtual machine, the virtual machine allocation unit 442 outputs, to the processor management unit 444, a pair of the virtual machine ID for identifying the virtual machine thus moved and the processor ID for identifying the processor to which the virtual machine has been moved.

With reference to the drawings, the following describes operations of the virtual machine system 100 having the above structure.

<Operations>

Among operations by the virtual machine system 100, the following describes characteristic operations, namely system startup processing and system update processing.

<System Startup Processing>

The system startup processing is processing of activating the virtual machine system 100 when the virtual machine system 100 is reset.

Figure 7:
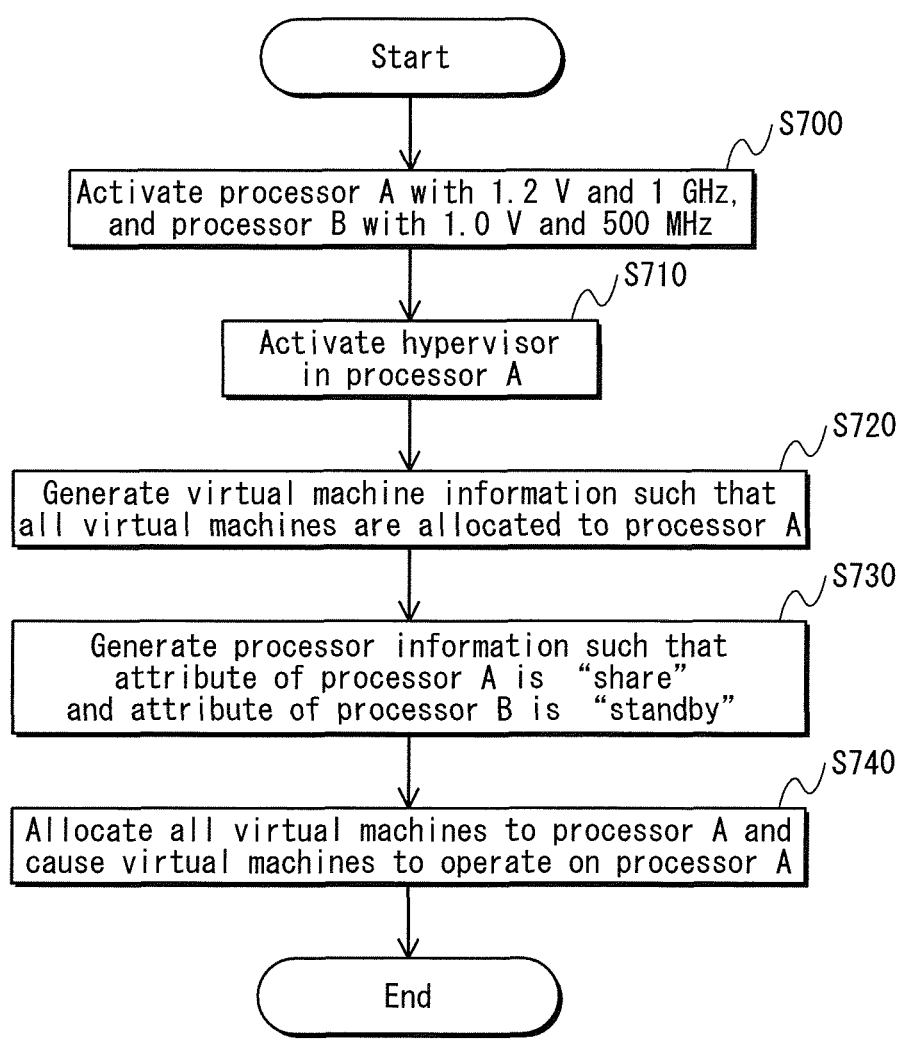
FIG. 7 is a flowchart showing system startup processing.

FIG. 7 is a flowchart showing the system startup processing.

When the virtual machine system 100 is reset, the power control block 111 supplies a supply voltage of 1.2 V to the processor A 101, and a supply voltage of 1.0 V to the processor B 102. Also, the clock control block 112 supplies a clock signal of 1 GHz to the processor A 101, and a clock signal of 500 MHz to the processor B 102. With the supply of the supply voltages and the clock signals, the processor A 101 and the processor B 102 are activated (step S700).

After being activated, the processor A 101 activates the hypervisor 440 (step S710).

After the hypervisor 440 is activated, the virtual machine management unit 443 generates the virtual machine information such that all of the virtual machines targeted for execution are associated with the processor A 101, and stores the virtual machine information thus generated into the virtual machine information storage unit 445 (step S720).

At this point, information indicating "0", which is an initial value, is assigned to each of the numbers of tasks 502 in the generated virtual machine information.

Upon completion of step S720, the processor management unit 444 generates the processor information such that: the attribute of the processor A 101 is "share"; the attribute of the processor B 102 is "standby"; the attribute of each of the processors C 103 and D 104 is "off"; the number of virtual machines associated with the processor A 101 is the total number of virtual machines targeted for execution; and the number of virtual machines associated with each of the processors B 102, C 103, and D 104 is "0" which is an initial value, and stores the processor information thus generated into the processor information storage unit 446 (step S730).

Upon completion of step S730, the virtual machine allocation unit 442 causes all the virtual machines to operate on the processor A 101, based on the virtual machine information stored in the virtual machine information storage unit 445 (step S740).

Upon completion of step S740, the virtual machine system 100 ends the system startup processing.

<System Update Processing>

The system update processing is processing of dynamically changing the attribute of each processor, based on a change in the number of tasks existing in each task queue managed by the OS operating in each virtual machine, and dynamically changing the allocation of the virtual machines to the processors.

Figure 8:
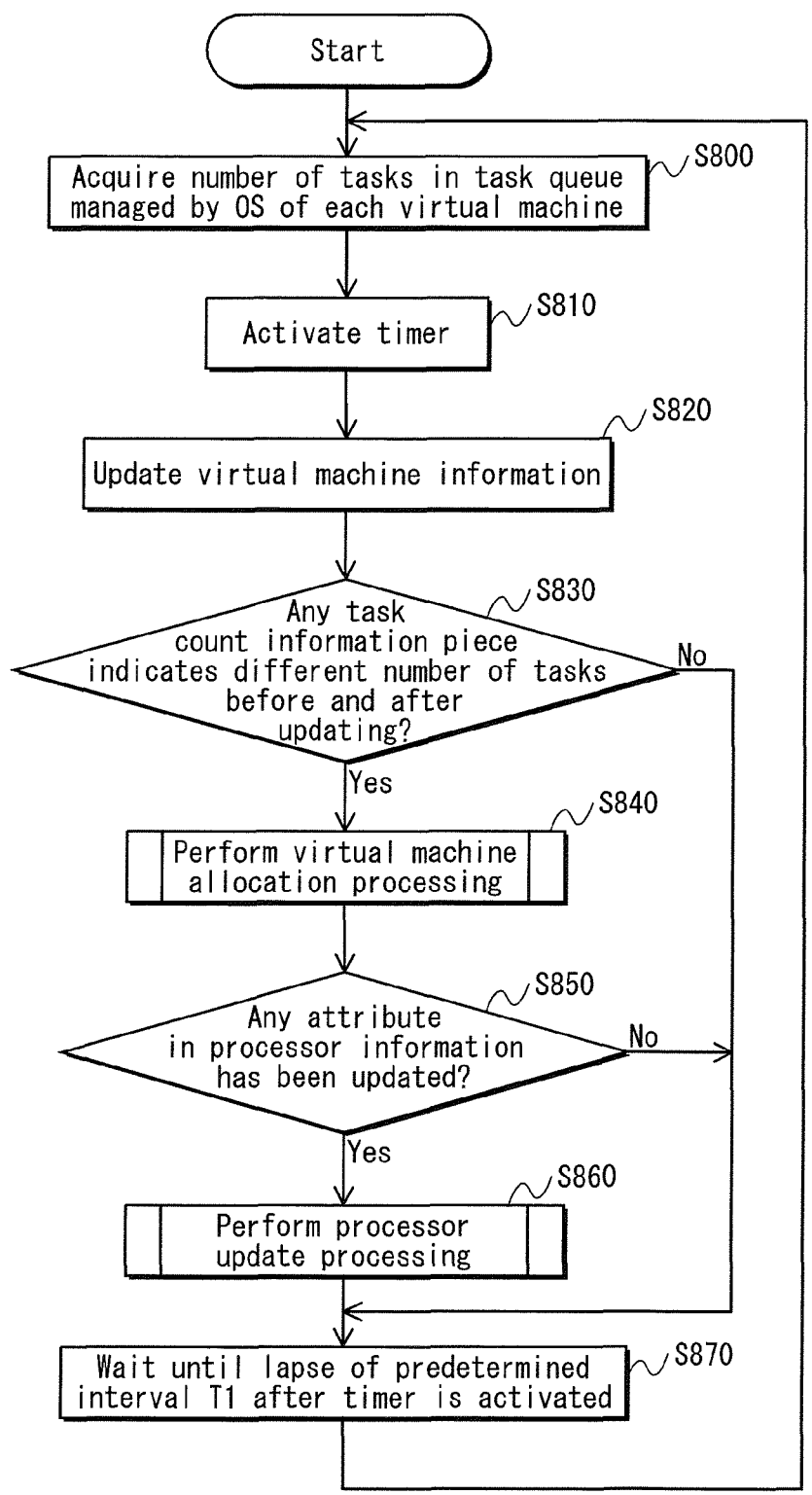
FIG. 8 is a flowchart showing system update processing.

FIG. 8 is a flowchart showing the system update processing.

While the virtual machine system 100 is in operation, the load monitoring unit 441 acquires from each OS, for each predetermined interval T1 (such as 100 µs), the number of tasks existing in a task queue managed by the OS with use of the timer function (step S800), and outputs to the virtual machine management unit 443, for each OS, (i) a task count information piece indicating the number of tasks acquired from the OS and (ii) the virtual machine ID for identifying a virtual machine in which the OS operates.

Upon completion of step S800, the load monitoring unit 441 activates the timer and newly starts measuring a predetermined interval T1, such as 100 µs (step S810).

Upon completion of step S810, the virtual machine management unit 443 updates the virtual machine information stored in the virtual machine information storage unit 445, based on the pairs of the task count information pieces and the virtual machine IDs thus received (step S820).

Upon completion of step S820, the virtual machine management unit 443 checks whether the number of tasks before updating is different from the number of tasks after updating in regard to any of the task count information pieces (step S830).

If the number of tasks before updating is different from the number of tasks after updating in regard to any of the task count information pieces in step S830 (step S830: Yes), the virtual machine management unit 443 outputs, to the virtual machine allocation unit 442, the virtual machine ID corresponding to the task count information piece indicating a different number of tasks before and after updating. Subsequently, the virtual machine system 100 starts virtual machine allocation processing (step S840).

Figure 9:
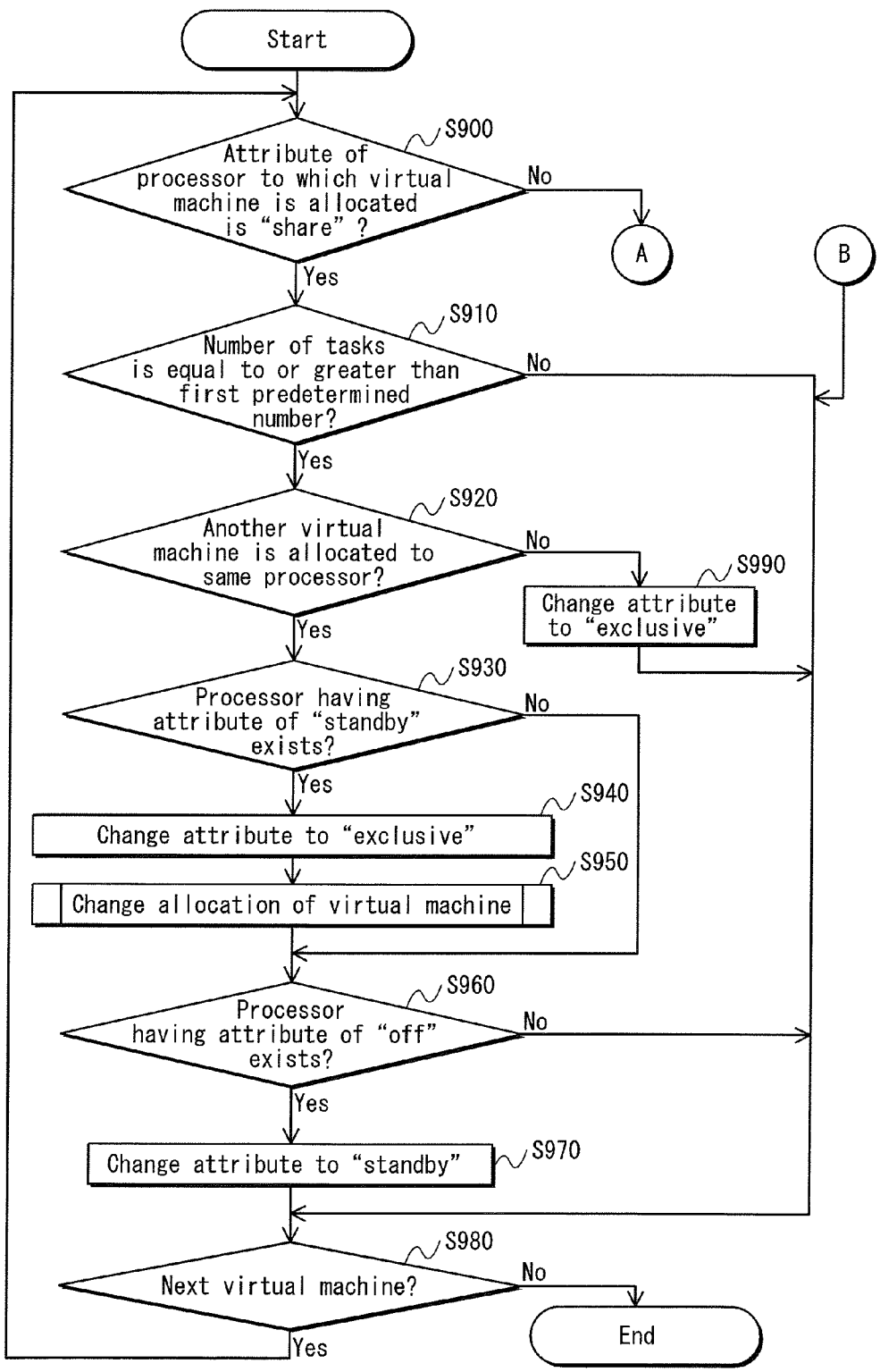
FIG. 9 is flowchart 1 showing virtual machine allocation processing.
Figure 10:
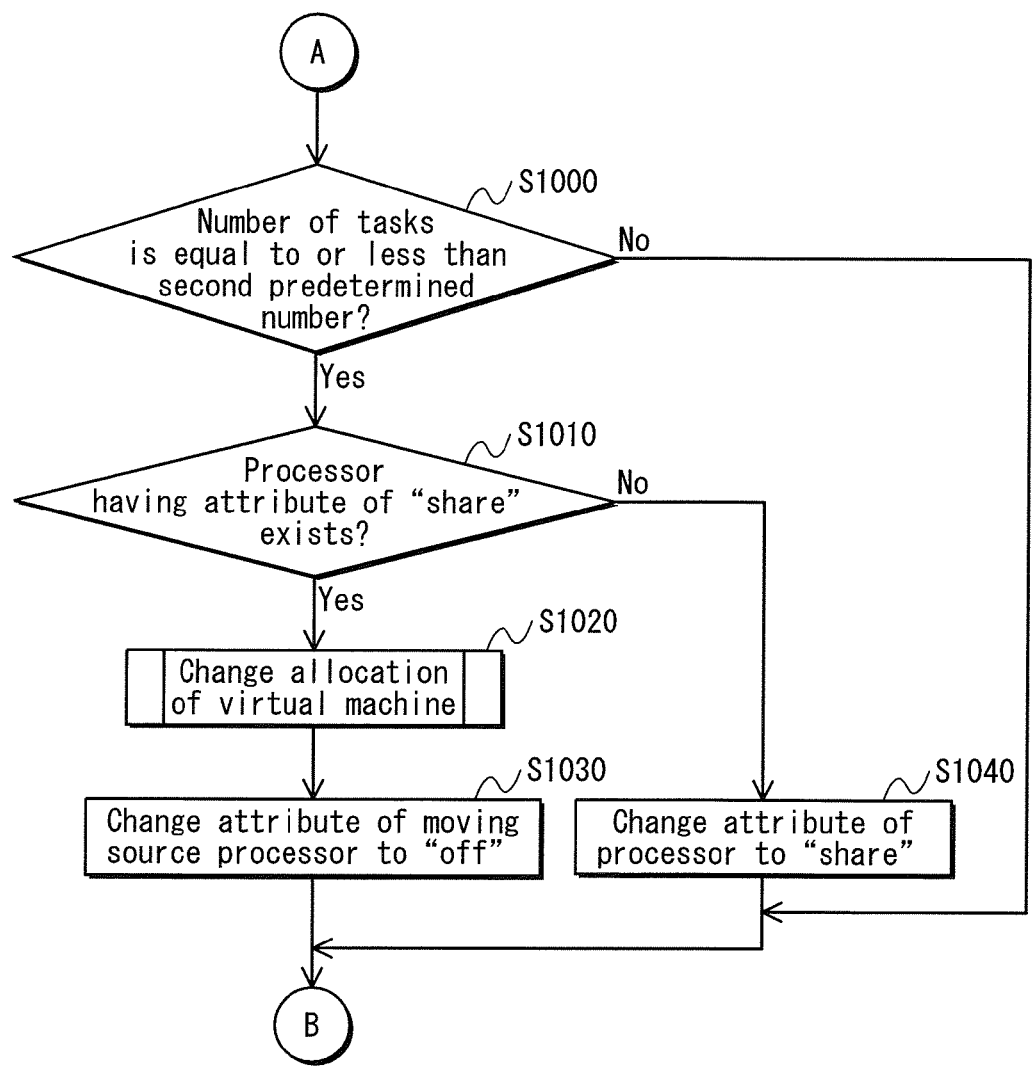
FIG. 10 is flowchart 2 showing the virtual machine allocation processing.

FIGS. 9 and 10 are each a flowchart showing the virtual machine allocation processing performed by the virtual machine system 100.

Upon receiving one or more virtual machine IDs each corresponding to a different number of tasks before and after updating, the virtual machine allocation unit 442 selects one virtual machine ID from among the one or more virtual machine IDs thus received.

After selecting one virtual machine ID, the virtual machine allocation unit 442 reads (i) the virtual machine information stored in the virtual machine information storage unit 445 and (ii) the processor information stored in the processor information storage unit 446, and checks whether the attribute of the processor on which the virtual machine identified by the selected virtual machine ID is operating is "share" (step S900).

If the attribute of the processor on which the virtual machine identified by the selected virtual machine ID is operating is "share" in step S900 (step S900: Yes), the virtual machine allocation unit 442 checks whether the number of tasks corresponding to the virtual machine is equal to or greater than a first predetermined number (such as 30) (step S910).

If the number of tasks is equal to or greater than the first predetermined number (such as 30) in step S910, the virtual machine allocation unit 442 checks whether another virtual machine is allocated to, and operating on, the processor on which the virtual machine identified by the selected virtual machine ID is operating (step S920).

If another virtual machine is allocated to and operating on the processor in step S920 (step S920: Yes), the virtual machine allocation unit 442 checks whether a processor having the attribute of "standby" exists (step S930).

If a processor having the attribute of "standby" exists in step S930 (step S930: Yes), the virtual machine allocation unit 442 causes the processor management unit 444 to update the processor information stored in the processor information storage unit 446, such that the attribute of the processor is changed from "standby" to "exclusive" (step S940).

Upon completion of step S940, the virtual machine allocation unit 442 changes the processor to which the virtual machine identified by the selected virtual machine ID is allocated to operate, from the processor to which the virtual machine is currently allocated to operate (hereinafter "moving source processor") to the processor whose attribute has been changed from "standby" to "exclusive" in step S940 (hereinafter "moving destination processor") (step S950: virtual machine allocation change processing).

Figure 11:
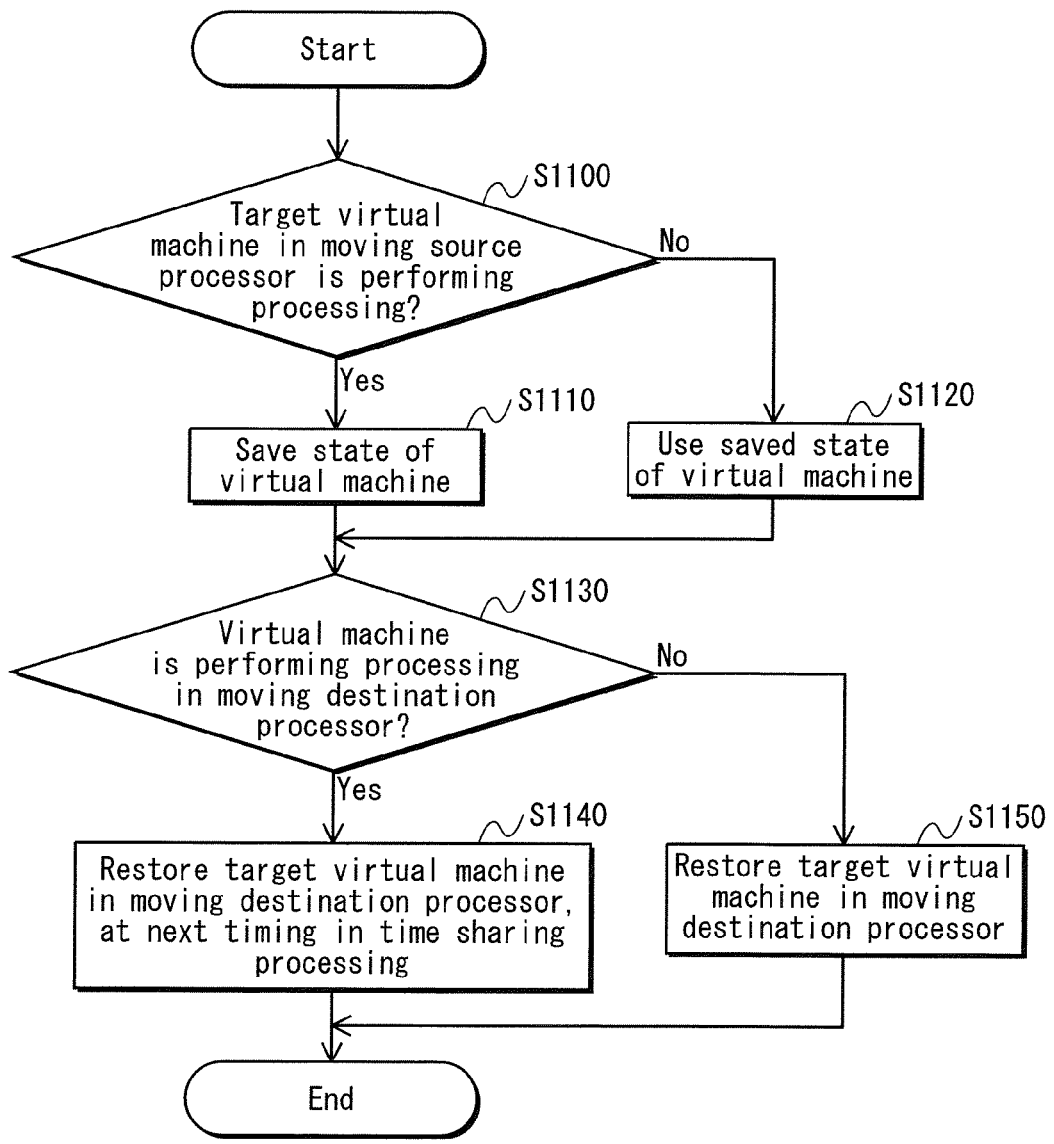
FIG. 11 is a flowchart showing virtual machine allocation change processing.

FIG. 11 is a flowchart showing the virtual machine allocation change processing performed by the virtual machine system 100.

When the virtual machine allocation change processing is started by the virtual machine system 100, the virtual machine allocation unit 442 checks whether a target virtual machine in the moving source processor is performing processing (step S1100).

If the target virtual machine in the moving source processor is performing processing in step S1100 (step S1100: Yes), the virtual machine allocation unit 442 saves the state of the target virtual machine that is performing processing (i.e., a data set necessary for restoring the processing of the target virtual machine, such as data stored in each register) into a predetermined area of the RAM 114 (step S1110).

In step S1100, if the target virtual machine in the moving source processor is not performing processing (step S1100: No), the target virtual machine is in a state where data thereof is saved by time sharing. Accordingly, the state of the target virtual machine is saved in a predetermined area of the RAM 114 (step S1120).

Upon completion of step S1110 or step S1120, the virtual machine allocation unit 442 checks whether a virtual machine is in operation in the moving destination processor (step S1130).

In step S1130, if a virtual machine is in operation in the moving destination processor (step S1130: Yes), the virtual machine allocation unit 442 restores the target virtual machine in the moving destination processor and causes the target virtual machine to operate, at the timing when the processing of the target virtual machine is to be performed in the time sharing processing by the moving destination processor, with use of the state of the target virtual machine that has been saved (step S1140).

In step S1130, if a virtual machine is not in operation in the moving destination processor (step S1130: No), the virtual machine allocation unit 442 restores the target virtual machine in the moving destination processor and causes the target virtual machine to operate, with use of the state of the target virtual machine that has been saved (step S1150).

Upon completion of step S1140 or step S1150, the virtual machine system 100 ends the virtual machine allocation change processing.

Returning again to FIG. 9, description of the virtual machine allocation processing continues.

Upon completion of step S950 or when a processor having the attribute of "standby" does not exist in step S930 (step S930: No), the virtual machine allocation unit 442 checks whether a processor having the attribute of "off" exists (step S960).

If a processor having the attribute of "off" exists in step S960 (step S960: Yes), the virtual machine allocation unit 442 causes the processor management unit 444 to update the processor information stored in the processor information storage unit 446, such that the attribute of the processor is changed from "off" to "standby" (step S970).

If another virtual machine is not allocated to the processor to operate in step S920 (step S920: No), the virtual machine allocation unit 442 causes the processor management unit 444 to update the processor information stored in the processor information storage unit 446, such that the attribute of the processor is changed from "share" to "exclusive" (step S990).

If the attribute of the processor on which the virtual machine identified by the selected virtual machine ID is operating is not "share" in step S900, i.e., the attribute of the processor is "exclusive" (step S900: No), the virtual machine allocation unit 442 checks whether the number of tasks corresponding to the virtual machine is equal to or less than a second predetermined number (such as 25) (step S1000 of FIG. 10).

If the number of tasks is equal to or less than the second predetermined number (such as 25) in step S1000 (step S1000: Yes), the virtual machine allocation unit 442 checks whether a processor having the attribute of "share" exists (step S1010).

If a processor having the attribute of "share" exists in step S1010 (step S1010: Yes), the virtual machine system 100 performs the aforementioned virtual machine allocation processing (see FIG. 11) with the moving source processor being the processor to which the virtual machine identified by the selected virtual machine ID is allocated to operate, and the moving destination processor being the processor having the attribute of "share" (step S1020).

Upon completion of step S1020, the virtual machine allocation unit 442 causes the processor management unit 444 to update the processor information stored in the processor information storage unit 446, such that the attribute of the moving source processor is changed to "off" (step S1030).

If a processor having the attribute of "share" does not exist in step S1010 (step S1010: No), the virtual machine allocation unit 442 causes the processor management unit 444 to update the processor information stored in the processor information storage unit 446, such that the attribute of the processor to which the virtual machine identified by the selected virtual machine ID is allocated to operate is "share" (step S1040).

The virtual machine allocation unit 442 checks whether a virtual machine ID yet to be selected exists among the received virtual machine IDs (step S980 in FIG. 9) in any of the following cases: the number of tasks is not equal to nor greater than the first predetermined number (such as 30) in step S910 (step S910: No); the processing of step S990 is completed; a processor having the attribute of "off" does not exist in step S960 (step S960: No); the number of tasks is not equal to nor less than the second predetermined number (such as 25) in step S1000 (step S1000: No); the processing of step S1030 is completed; and the processing of step S1040 is completed.

If one or more virtual machine IDs yet to be selected exist in step S980 (step S980: Yes), the virtual machine allocation unit 442 selects one virtual machine ID from among the one or more virtual machine IDs yet to be selected, returns to step S900, and performs the processing from step S900 onward.

If a virtual machine ID yet to be selected does not exist in step S980 (step S980: No), the virtual machine system 100 ends the virtual machine allocation processing.

Returning again to FIG. 8, description of the system update processing continues.

Upon completion of the processing in step S840, the processor management unit 444 checks whether the attribute of any processor, from among the processors indicated in the processor information stored in the processor information storage unit 446, has been updated in the virtual machine allocation processing in step S840 (step S850).

If the attribute of any processor in the processor information has been updated in step S850 (step S850: Yes), the processor management unit 444 performs processor update processing for each processor whose attribute has been updated (step S860).

Figure 12:
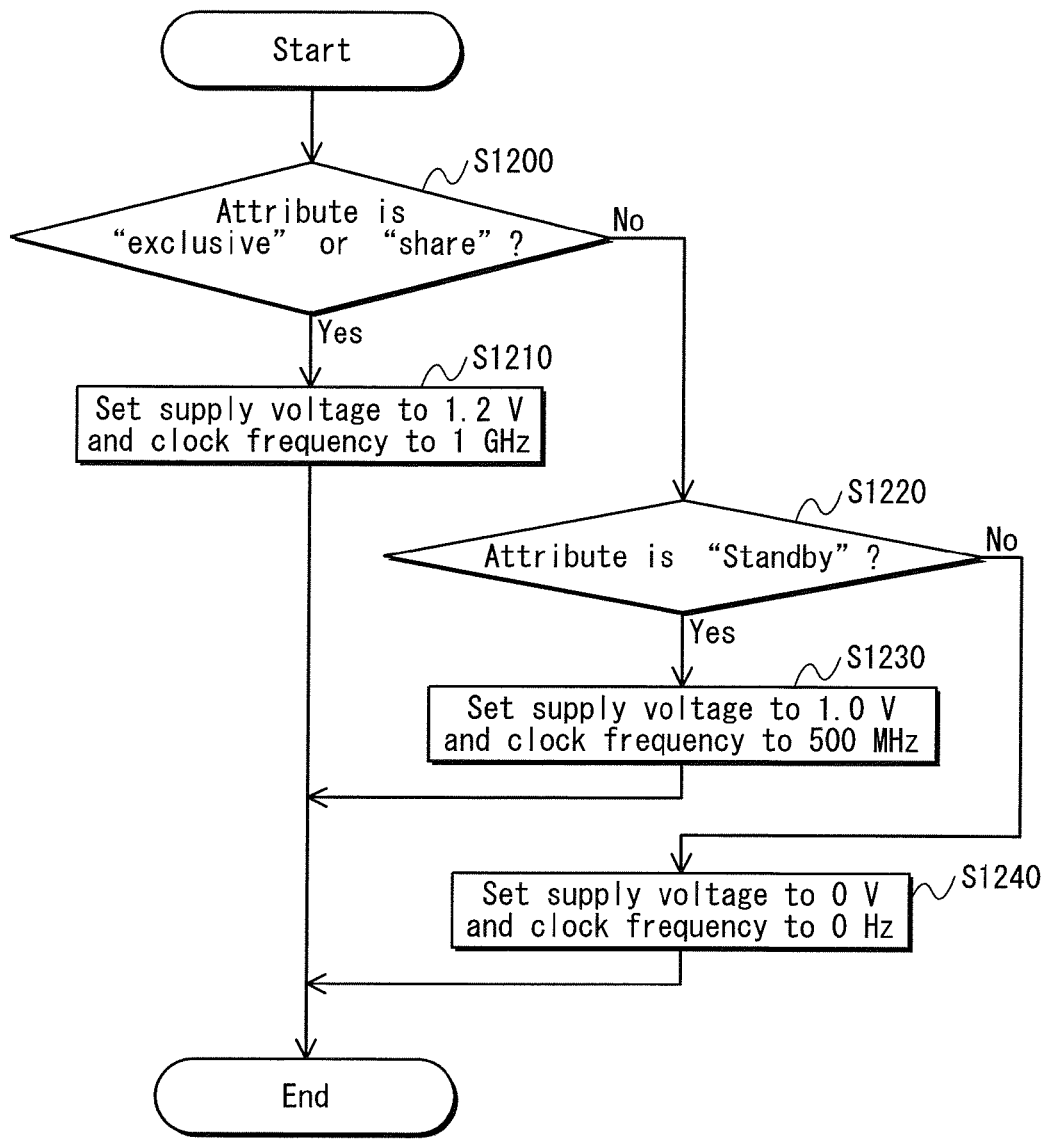
FIG. 12 is a flowchart showing processor update processing.

FIG. 12 is a flowchart showing the processor update processing performed by the processor management unit 444.

When the processor update processing is started, the processor management unit 444 checks whether the current attribute of a target processor is "exclusive" or "share" (step S1200).

If the current attribute of the target processor is "exclusive" or "share" in step S1200 (step S1200: Yes), the processor management unit 444 changes or maintains the supply voltage supplied to the processor to be 1.2 V, and changes or maintains the frequency of a clock signal supplied to the processor to be 1 GHz (step S1210).

If the current attribute of the target processor is not "exclusive" or "share" in step S1200 (step S1200: No), the processor management unit 444 checks whether the current attribute of the target processor is "standby" (step S1220).

If the current attribute of the target processor is "standby" in step S1220 (step S1220: Yes), the processor management unit 444 changes the supply voltage supplied to the processor to 1.0 V, and changes the frequency of a clock signal supplied to the processor to 500 MHz (step S1230).

If the current attribute of the target processor is not "standby" in step S1220 (step S1220: No), the processor management unit 444 changes the supply voltage supplied to the processor to 0 V, and changes the frequency of a clock signal supplied to the processor to 0 Hz (step S1240).

The processor management unit 444 ends the processor update processing in any of the following cases: the processing of step S1210 is completed; the processing of step S1230 is completed; and the processing of step S1240 is completed.

Returning again to FIG. 8, description of the system update processing continues.

The load monitoring unit 441 waits until the lapse of time measured by the activated timer reaches the predetermined interval T1 (such as 100 μs) (step S870) in any of the following cases: the number of tasks before updating is not different from the number of tasks after updating in regard to each of the task count information pieces in step S830 (step S830: No); the attributes of the processors in the processor information have not been updated in step S850 (step S850: No); and the processing of step S860 is completed.

When the lapse of time measured by the timer reaches the predetermined interval T1 (such as 100 μs), the load monitoring unit 441 returns to step S800, and performs the processing from step S800 onward.

<Specific Example>

The following describes a specific example of the aforementioned system update processing.

Figure 15:
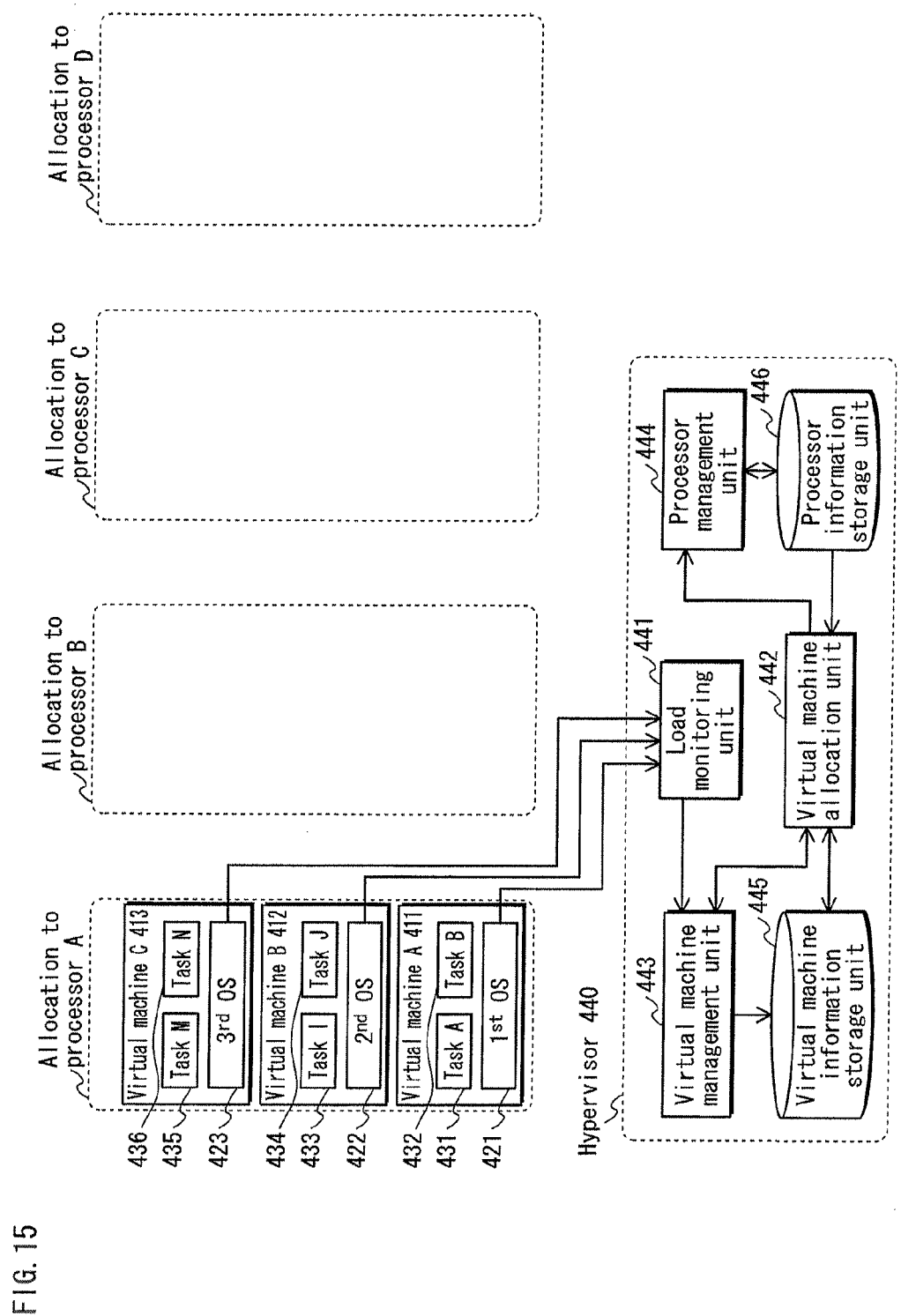
FIG. 15 is a functional structure diagram showing the main functional blocks constituting the virtual machine system 100.

This example describes the system update processing performed in the following situation. At time t1, the virtual machine information stored in the virtual machine information storage unit 445 is as shown in FIG. 13, and the processor information stored in the processor information storage unit 446 is as shown in FIG. 14. Also, the virtual machines A 411, B 412, and C 413 are allocated to the processor A 101 to operate. Further, the processor B 102 is activated in the power saving mode and stands by in preparation for a new allocation of a virtual machine, and the processors C 103 and D 104 are not supplied with power (see FIG. 15). Then, at time t2 given that all the above are satisfied at time t1, the number of tasks existing in the task queue managed by the third OS 423 is changed from five to forty.

After time t2, when the first timing arrives at which the load monitoring unit 441 acquires the number of tasks existing in the task queue managed by the OS of each virtual machine, the load monitoring unit 441 acquires the number of tasks for each OS and activates the timer, and the virtual machine management unit 443 updates the virtual machine information (steps S800 to S820).

The virtual machine information thus updated is as shown in FIG. 16.

Since the number of tasks of the virtual machine C 413 is changed from five to forty (step S830: Yes), the virtual machine system 100 performs the virtual machine allocation processing (step S840).

The following conditions are satisfied: the attribute of the processor A 101 on which the virtual machine C 413 operates is "share" (see FIG. 14, step S900: Yes); the number of tasks is equal to or greater than the first predetermined number (such as 30) (see FIG. 16, step S910: Yes); another virtual machine is allocated to the processor A 101 (step S920: Yes); and the processor B 102 has the attribute of "standby" (see FIG. 14, step S930: Yes). Accordingly, the virtual machine allocation unit 442 updates the processor information by changing the attribute of the processor B 102 to "exclusive" (step S940), and performs the virtual machine allocation processing (step S950).

The virtual machine allocation unit 442 changes the state of the virtual machine C 413 from the state of being allocated to the processor A 101 to operate to the state of being allocated to the processor B 102 to operate (steps S1100 to S1140).

Since the attribute of the processor C 103 is "off" (step S960: Yes), the virtual machine allocation unit 442 changes the attribute of the processor C 103 to "standby" to update the processor information (step S970).

Since no other virtual machine has the number of tasks that has changed (step S980: No), the virtual machine allocation unit 442 ends the virtual machine allocation processing, and the processor management unit 444 checks whether the attribute of any processor in the processor information has been updated (step S850).

FIG. 17 shows the processor information stored in the processor information storage unit 446 at this point, where the respective attributes of the processor B 102 and the processor C 103 have been changed (step S850: Yes).

The attribute of the processor B 102 is "exclusive" (step S1200: Yes). Accordingly, the processor management unit 444 changes the supply voltage supplied to the processor B 102 from 1.0 V to 1.2 V, changes the frequency of a clock signal supplied to the processor B 102 from 500 MHz to 1 GHz (step S1210), and sets the mode of the processor B 102 to the normal operation mode.

Figure 18:
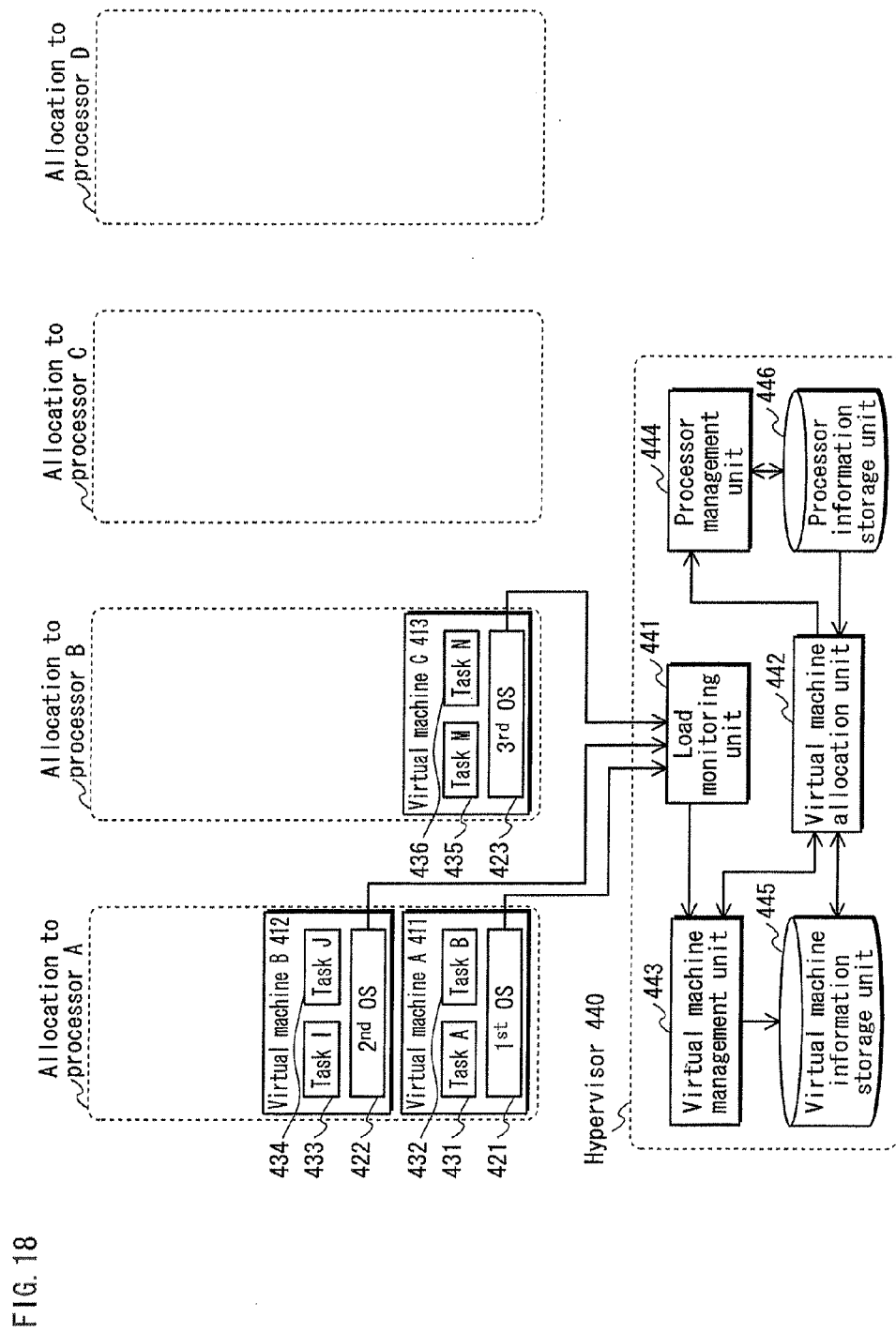
FIG. 18 shows the main functional blocks constituting the virtual machine system 100.

The attribute of the processor C 103 is "standby" (step S1200: No, and step S1220: Yes). Accordingly, the processor management unit 444 supplies a supply voltage of 1.0 V and a clock signal of 500 MHz to the processor C 103, and sets the mode of the processor C 103 to the power saving mode (see FIG. 18).

Thereafter, the load monitoring unit 441 waits until the lapse of time measured by the activated timer reaches the predetermined interval T1 (such as 100 μs) (step S870).

<Summary>

According to the virtual machine system 100 as described above, when there is a need for newly allocating a virtual machine to a processor that does not have any virtual machine allocated thereto and causing the processor to operate, the virtual machine is allocated to a processor already activated with the attribute of "standby" from among the processors that do not have any virtual machines allocated thereto, and the processor is then caused to operate.

Accordingly, the processor to which a virtual machine is newly allocated does not require such a long period as a few milliseconds in order to start processing.

Also, according to the virtual machine system 100, when there are a plurality of processors that do not have any virtual machines allocated thereto, one of the processors is activated as having the attribute of "standby" while the power of the rest of the processors is set to be "off".

Accordingly, as compared to a virtual machine system in which power is supplied to all processors that does not have any virtual machines allocated thereto, the virtual machine system 100 is different with respect to the following point. That is, even if there is an increase in the number of processors that do not have any virtual machines allocated thereto, said increase does not cause an increase in the power consumption by these processors, which do not perform processing pertaining to the virtual machines.

Also, according to the virtual machine system 100 as described above, a processor activated as having the attribute of "standby" operates in the power saving mode which consumes less power than in the normal operation mode.

Accordingly, as compared to a virtual machine system in which processors stand by in a normal operation mode in preparation for a new allocation of virtual machines, the virtual machine system 100 can suppress the power consumption by the processors that do not perform processing pertaining to the virtual machines.

<Embodiment 2>

<Outline>

As an embodiment of a virtual machine system according to the present invention, the following describes a virtual machine system that is a partial modification to the virtual machine system 100 of Embodiment 1.

The virtual machine system 100 according to Embodiment 1 includes four processors, whereas the modified virtual machine system includes three power saving processors and three high-performance processors instead of four processors.

Here, the power saving processors and the high-performance processors have the same ISA (Instruction Set Architecture). The power saving processors consume less power than the high-performance processors, but has a lower processing capability.

The modified virtual machine system executes a plurality of virtual machines in parallel, and performs the following control when some of the power saving processors do not have any virtual machines allocated thereto. That is, in preparation for a new allocation of a virtual machine to a power saving processor, the modified virtual machine system supplies power to one of the power saving processors that do not have any virtual machines allocated thereto, and causes the power saving processor to be placed in a standby state, and does not supply power to the rest of the power saving processors that do not have any virtual machines allocated thereto. Also, the modified virtual machine system performs the following control when some of the high-performance processors do not have any virtual machines allocated thereto. That is, in preparation for a new allocation of a virtual machine to a high-performance processor, the modified virtual machine system supplies power to one of the high-performance processors that do not have any virtual machines allocated thereto, and causes the high-performance processor to be placed in a standby state, and does not supply power to the rest of the high-performance processors that do not have any virtual machines allocated thereto.

With reference to the drawings, the following describes the structure of the modified virtual machine system according to Embodiment 2, focusing on the differences in structure from the virtual machine system 100 of Embodiment 1.

Figure 19:
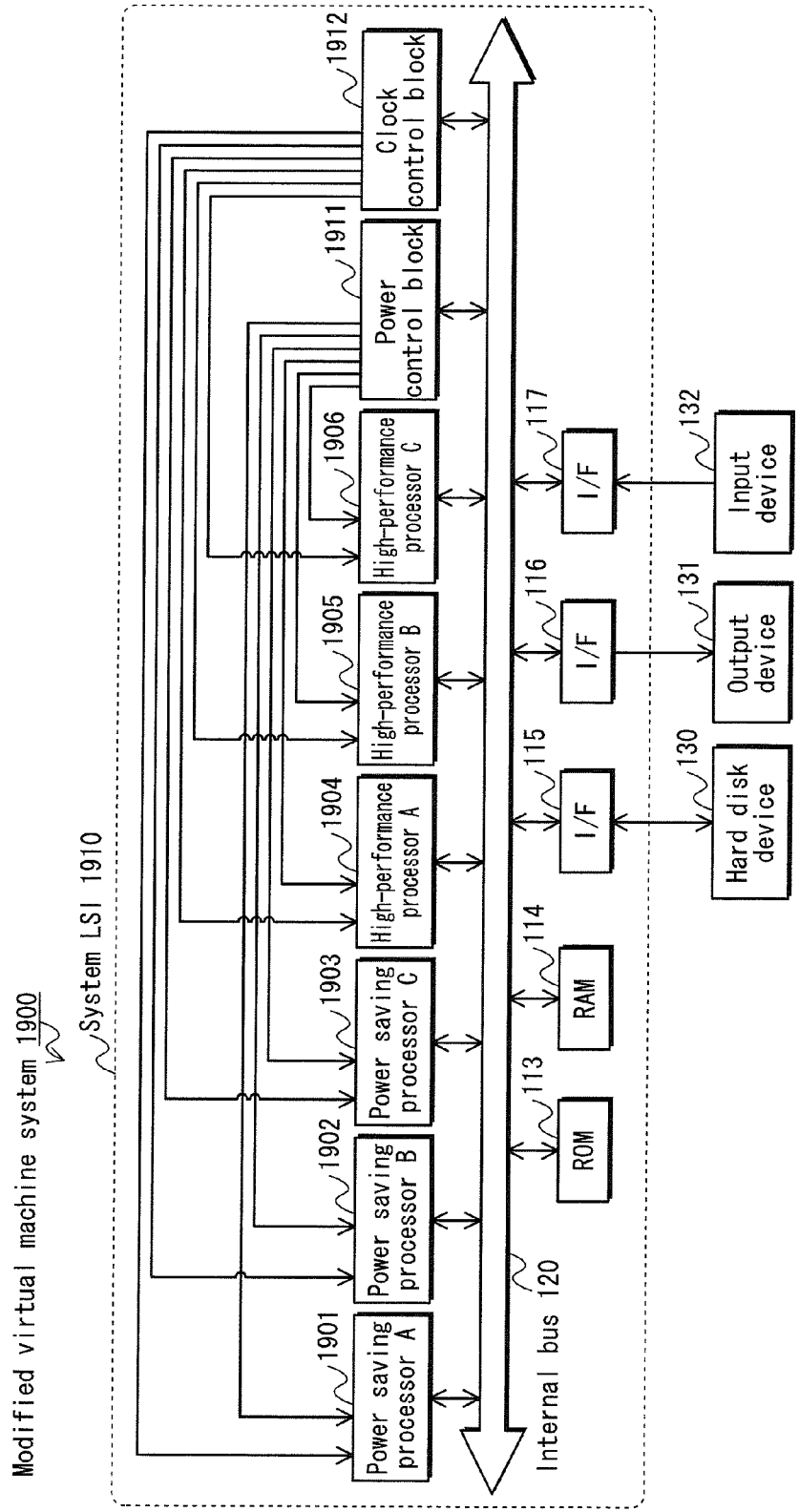
FIG. 19 is a block diagram showing the main hardware structure of a modified virtual machine system 1900.

FIG. 19 is a block diagram showing the main hardware structure of a modified virtual machine system 1900.

As shown in FIG. 19, the modified virtual machine system 1900 is a modification of the virtual machine system 100 according to Embodiment 1, such that the system LSI 110 is modified to a system LSI 1910.

Specifically, in the system LSI 1910, the power control block 111 is modified to a power control block 1911, the clock control block 112 is modified to a clock control block 1912, the processors A 101 to D 104 are removed and replaced with a power saving processor A 1901, a power saving processor B 1902, a power saving processor C 1903, a high-performance processor A 1904, a high-performance processor B 1905, and a high-performance processor C 1906.

Each of the power saving processors A 1901 to C 1903 is connected to the internal bus 120, the power control block 1911, and the clock control block 1912, executes a program stored in any of the ROM 113, the RAM 114, and the hard disk device 130 to control the power control block 1911, the clock control block 1912, the ROM 113, the RAM 114, the hard disk device 130, the output device 131, and the input device 132, thereby realizing various functions.

The power saving processors A 1901 to C 1903 have the same functions and operate in two different modes, i.e., a normal operation mode and a power saving mode. In the normal operation mode, the power saving processors A 1901 to C 1903 operate with a supply voltage of 1.0 V and an operating frequency of 500 MHz. In the power saving mode, the power saving processors A 1901 to C 1903 operate with a supply voltage of 0.8 V and an operating frequency of 250 MHz.

Also, the power saving processors A 1901 to C 1903 are activated when the voltage of a power supply is changed from 0 V to at least 0.8 V and a clock signal is supplied to the processors A 1901 to C 1903.

Each of the high-performance processors A 1904 to C 1906 is connected to the internal bus 120, the power control block 1911, and the clock control block 1912, executes a program stored in any of the ROM 113, the RAM 114, and the hard disk device 130 to control the power control block 1911, the clock control block 1912, the ROM 113, the RAM 114, the hard disk device 130, the output device 131, and the input device 132, thereby realizing various functions.

The high-performance processors A 1904 to C 1906 have the same ISA as the power saving processors A 1901 to C 1903, and have the same functions. The high-performance processors A 1904 to C 1906 operate in two different modes, i.e., a normal operation mode and a power saving mode. In the normal operation mode, the high-performance processors A 1904 to C 1906 operate with a supply voltage of 1.2 V and an operating frequency of 1 GHz. In the power saving mode, the high-performance processors A 1904 to C 1906 operate with a supply voltage of 1.0 V and an operating frequency of 500 MHz.

Also, the high-performance processors A 1904 to C 1906 are activated when the voltage of a power supply is changed from 0 V to at least 1.0 V and a clock signal is supplied to the high-performance processors A 1904 to C 1906.

The power control block 1911 is connected to the internal bus 120, the power saving processors A 1901 to C 1903, and the high-performance processors A 1904 to C 1906, and is controlled by any of the power saving processors A 1901 to C 1903 and the high-performance processors A 1904 to C 1906. The power control block 1911 switches the voltage of power supply to the power saving processors A 1901 to C 1903 and the high-performance processors A 1904 to C 1906.

Figure 20:
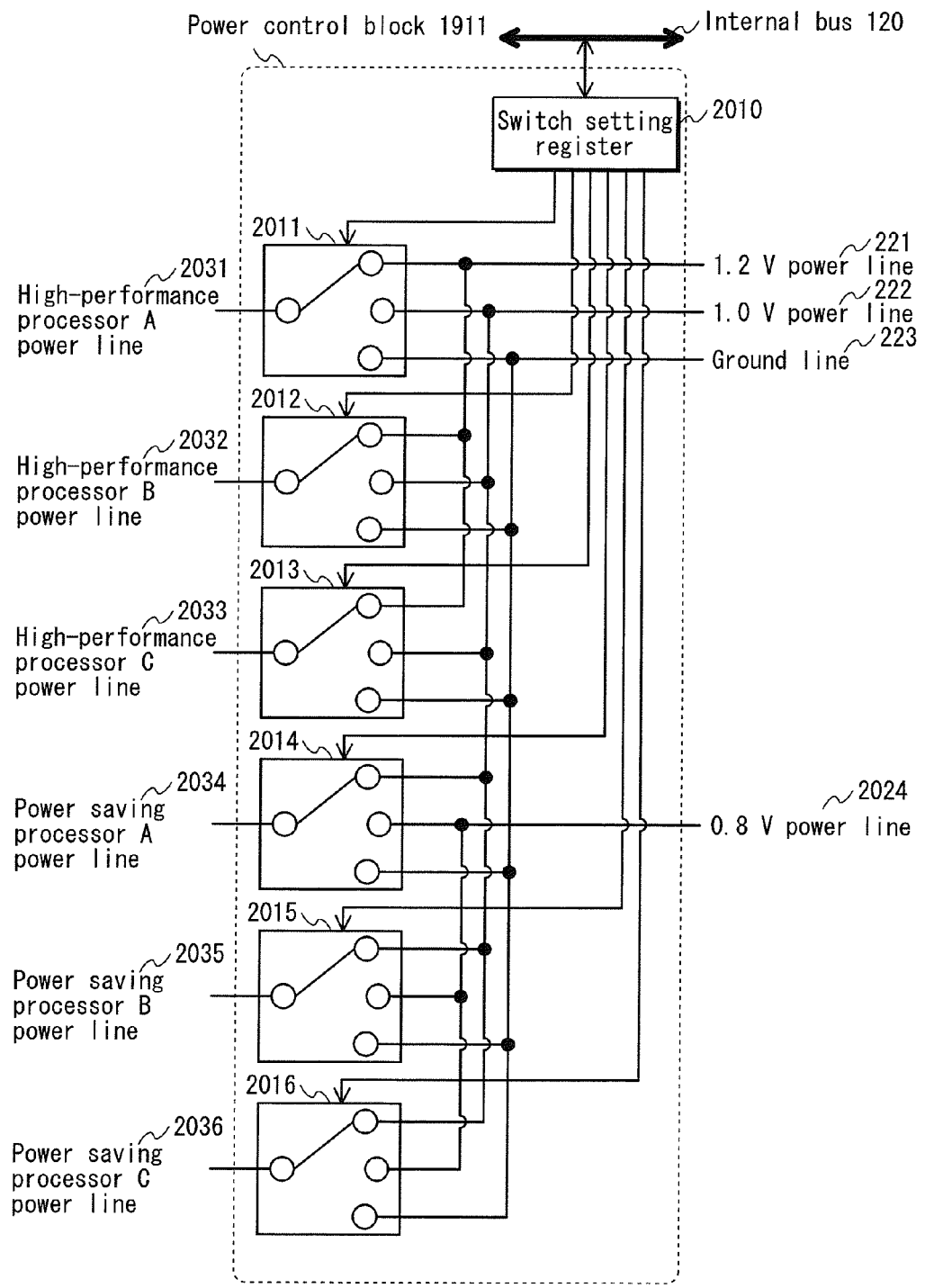
FIG. 20 is a block diagram showing the structure of a power control block 1911.

FIG. 20 shows the main hardware structure of the power control block 1911.

As shown in FIG. 20, the power control block 1911 includes a switch setting register 2010, and power switches 2011, 2012, 2013, 2014, 2015, and 2016.

The switch setting register 2010 is connected to the internal bus 120, and the power switches 2011 to 2016. The switch setting register 2010 is a 12-bit register into which any of the power saving processors A 1901 to C 1903 and the high-performance processors A 1904 to C 1906 writes a value.

The power switch 2011 is connected to the switch setting register 2010, the 1.2 V power line 221 for supplying a voltage of 1.2 V, the 1.0 V power line 222 for supplying a voltage of 1.0 V, the ground line 223 for supplying a voltage of 0 V, and a high-performance processor A power line 2031 for supplying voltage to the high-performance processor A 1904. The power switch 2011 selects one of three lines, i.e., the 1.2 V power line 221, the 1.0 V power line 222, and the ground line 223, according to the values written in the zeroth bit and the first bit of the switch setting register 2010, and electrically connects the selected line to the high-performance processor A power line 2031.

The power switches 2012 and 2013 have a similar structure to the power switch 2011.

The power switch 2012 selects a line according to the values written in the second bit and the third bit of the switch setting register 2010, and electrically connects the selected line to a high-performance processor B power line 2032, which is a power line for supplying voltage to the high-performance processor B 1905. The power switch 2013 selects a line according to the values written in the fourth bit and the fifth bit of the switch setting register 2010, and electrically connects the selected line to a high-performance processor C power line 2033, which is a power line for supplying voltage to the high-performance processor C 1906.

The power switch 2014 is connected to the switch setting register 2010, the 1.0 V power line 222 for supplying a voltage of 1.0 V, a 0.8 V power line 2024 for supplying a voltage of 0.8 V, the ground line 223 for supplying a voltage of 0 V, and a power saving processor A power line 2034 for supplying voltage to the power saving processor A 1901. The power switch 2014 selects one of three lines, i.e., the 1.0 V power line 222, the 0.8 V power line 2024, and the ground line 223, according to the values written in the sixth bit and the seventh bit of the switch setting register 2010, and electrically connects the selected line to the power saving processor A power line 2034.

The power switches 2015 and 2016 have a similar structure to the power switch 2014.

The power switch 2015 selects a line according to the values written in the eighth bit and the ninth bit of the switch setting register 2010, and electrically connects the selected line to a power saving processor B power line 2035, which is a power line for supplying voltage to the power saving processor B 1902. The power switch 2016 selects a line according to the values written in the tenth bit and the eleventh bit of the switch setting register 2010, and electrically connects the selected line to a power saving processor C power line 2036, which is a power line for supplying voltage to the power saving processor C 1903.

In the case where the modified virtual machine system 1900 is reset, an initial value is assigned to the switch setting register 2010, whereby the power control block 1911 supplies a voltage of 1.0 V to the power saving processor A 1901, and a voltage of 0 V to the power saving processors B 1902 and C 1903, and the high-performance processors A 1904 to C 1906.

Returning again to FIG. 19, descriptions of the main hardware structure of the modified virtual machine system 1900 continues.

The clock control block 1912 is connected to the internal bus 120, the power saving processors A 1901 to C 1903, and the high-performance processors A 1904 to C 1906, and is controlled by any of the power saving processors A 1901 to C 1903 and the high-performance processors A 1904 to C 1906. The clock control block 1912 switches the frequency of a clock signal to be supplied to the power saving processors A 1901 to C 1903 and the high-performance processors A 1904 to C 1906.

Figure 21:
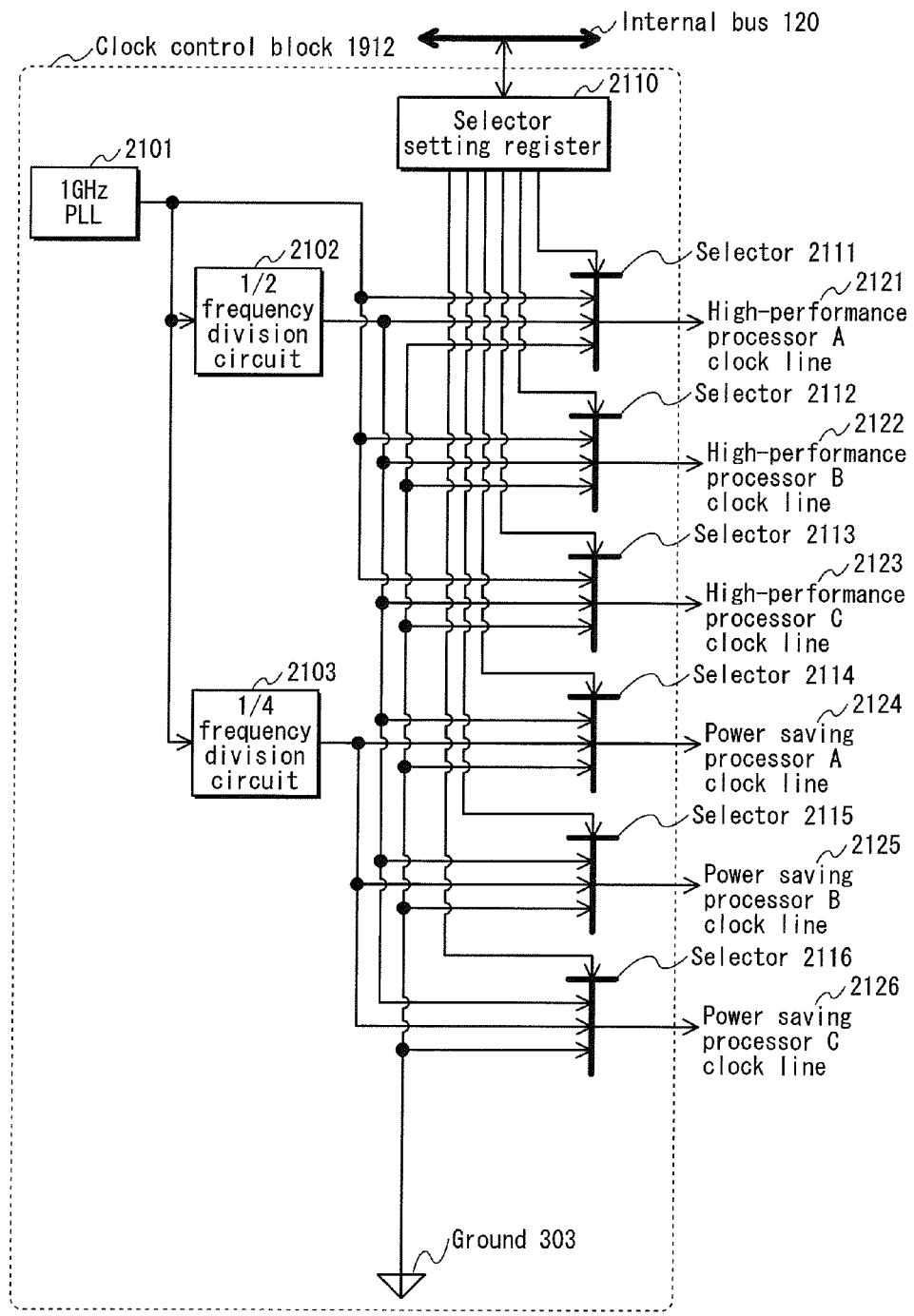
FIG. 21 shows the structure of a clock control block 1912.

FIG. 21 shows the main hardware structure of the clock control block 1912.

As shown in FIG. 21, the clock control block 1912 includes a selector setting register 2110, a 1 GHz PLL 2101, a ½ frequency division circuit 2102, a ¼ frequency division circuit 2103, and selectors 2111, 2112, 2113, 2114, 2115, and 2116.

The selector setting register 2110 is connected to the internal bus 120 and the selectors 2111 to 2113. The selector setting register 2110 is a 12-bit register into which any of the power saving processors A 1901 to C 1903 and the high-performance processors A 1904 to C 1906 writes a value.

The 1 GHz PLL 2101 is connected to the ½ frequency division circuit 2102, the ¼ frequency division circuit 2103, and the selectors 2111 to 2116. The 1 GHz PLL 2101 generates and outputs a clock signal having a frequency of 1 GHz, similarly to the 1 GHz PLL 301 according to Embodiment 1.

The ½ frequency division circuit 2102 is connected to the 1 GHz PLL 2101 and the selectors 2111 to 2113. The ½ frequency division circuit 2102 divides by two a clock signal having a frequency of 1 GHz input thereto, and outputs a clock signal having a frequency of 500 MHz, similarly to the ½ frequency division circuit 302 according to Embodiment 1.

The ¼ frequency division circuit 2103 is connected to the 1 GHz PLL 2101, and the selectors 2114 to 2116. The ¼ frequency division circuit 2103 divides by four the clock signal having a frequency of 1 GHz input thereto, and outputs a clock signal having a frequency of 250 MHz.

The selector 2111 is connected to the selector setting register 2110, the 1 GHz PLL 2101, the ½ frequency division circuit 2102, the ground 303, and a high-performance processor A clock line 2121 for supplying a clock signal to the high-performance processor A 1904. The selector 2111 selects one of three clock signals, i.e., a clock signal having a frequency of 1 GHz, a clock signal having a frequency of 500 MHz, and a clock signal having a frequency of 0 Hz, according to the values written in the zeroth bit and the first bit of the selector setting register 2110, and outputs the selected clock signal to the high-performance processor A 1904 via the high-performance processor A clock line 2121.

The selectors 2112 and 2113 have a similar structure to the selector 2111.

The selector 2112 selects a clock signal according to the values written in the second bit and the third bit of the selector setting register 2110, and outputs the selected clock signal to the high-performance processor B 1905 via a high-performance processor B clock line 2122. The selector 2113 selects a clock signal according to the fourth bit and the fifth bit of the selector setting register 2110, and outputs the selected clock signal to the high-performance processor C 1906 via a high-performance processor C clock line 2123.

The selector 2114 is connected to the selector setting register 2110, the ½ frequency division circuit 2102, the ¼ frequency division circuit 2103, the ground 303, and a power saving processor A clock line 2124 for supplying a clock signal to the power saving processor A 1901. The selector 2114 selects one of three clock signals, i.e., a clock signal having a frequency of 500 MHz, a clock signal having a frequency of 250 MHz, and a clock signal having a frequency of 0 Hz, according to the values written in the sixth bit and the seventh bit of the selector setting register 2110, and outputs the selected clock signal to the power saving processor A 1901 via the power saving processor A clock line 2124.

The selectors 2115 and 2116 have a similar structure to the selector 2114.

The selector 2115 selects a clock signal according to the values written in the eighth bit and the ninth bit of the selector setting register 2110, and outputs the selected clock signal to the power saving processor B 1902 via a power saving processor B clock line 2125. The selector 2116 selects a clock signal according to the tenth bit and the eleventh bit of the selector setting register 2110, and outputs the selected clock signal to the power saving processor C 1903 via a power saving processor C clock line 2126.

In the case where the modified virtual machine system 1900 is reset, an initial value is assigned to the selector setting register 2110, whereby the clock control block 1912 outputs a clock signal of 500 MHz to the power saving processor A 1901, and a clock signal of 0 Hz to each of the power saving processors B 1902 and C 1903, and the high-performance processors A 1904 to C 1906.

The following describes the functions of the modified virtual machine system 1900 realized by the aforementioned hardware, with reference to the drawings.

Figure 22:
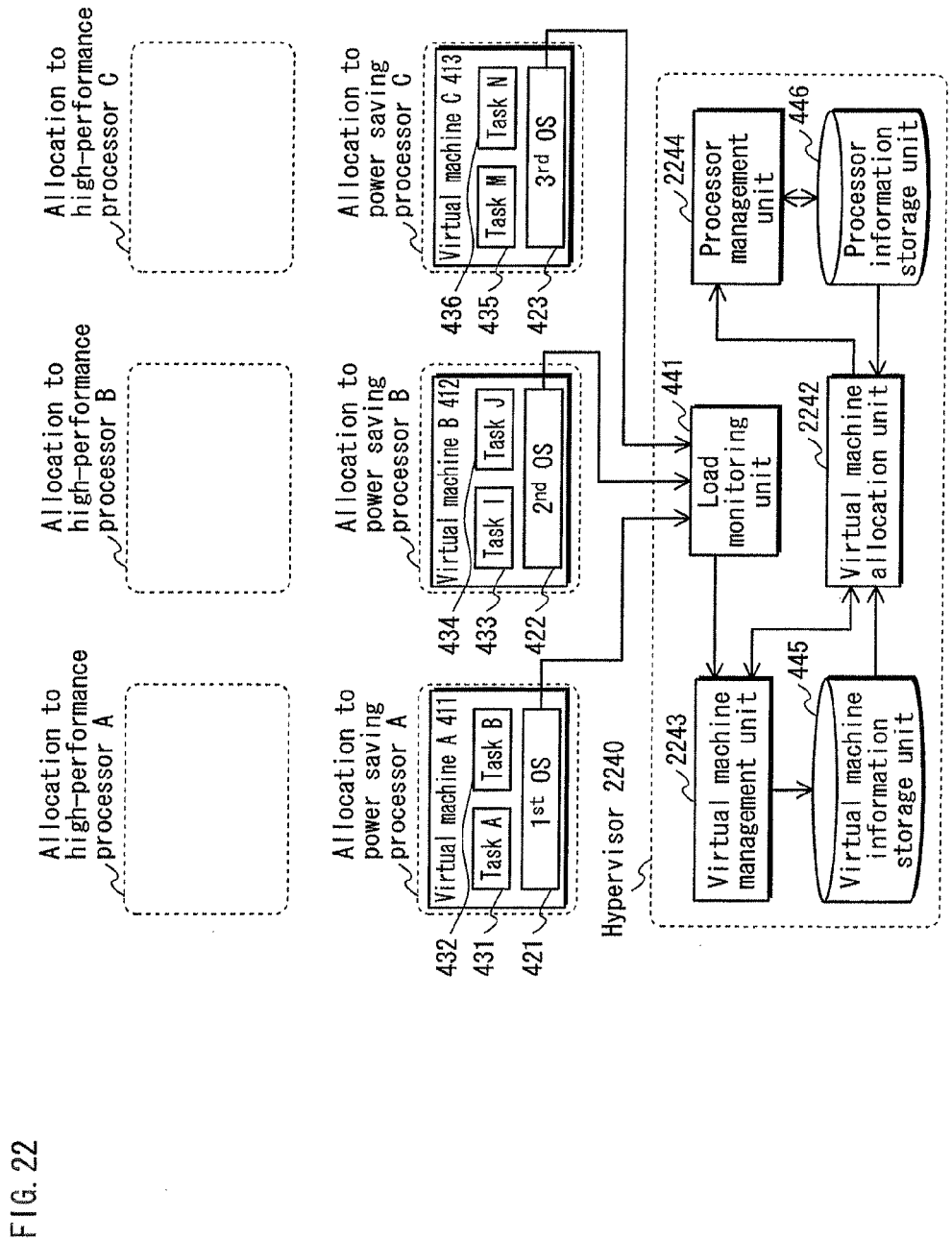
FIG. 22 is a functional structure diagram showing the main functional blocks constituting the modified virtual machine system 1900.

FIG. 22 is a functional structure diagram showing the main functional blocks constituting the modified virtual machine system 1900, in a state where a virtual machine is allocated to each of the power saving processors A 1901 to C 1903.

As shown in FIG. 22, the modified virtual machine system 1900 is a modification of the virtual machine system 100 according to Embodiment 1, such that the hypervisor 440 is modified to a hypervisor 2240.

Specifically, in the hypervisor 2240, the virtual machine allocation unit 442 is modified to a virtual machine allocation unit 2242, the virtual machine management unit 443 is modified to a virtual machine management unit 2243, and the processor management unit 444 is modified to a processor management unit 2244.

The virtual machine management unit 2243 is a partial modification of the virtual machine management unit 443 in Embodiment 1. The virtual machine management unit 2243 is connected to the load monitoring unit 441, the virtual machine allocation unit 2242, and the virtual machine information storage unit 445, and has a function 1a described below, in addition to the functions 2, 3, and 4 of the virtual machine management unit 443.

Function 1a: At the start up of the hypervisor 2240, the virtual machine management unit 2243 generates virtual machine information such that each of the virtual machines targeted for execution is associated with a different processor, and stores the virtual machine information thus generated into the virtual machine information storage unit 445.

Here, the virtual machines targeted for execution are allocated in the order of: the power saving processor A 1901, the power saving processor B 1902, the power saving processor C 1903, the high-performance processor A 1904, the high-performance processor B 1905, and the high-performance processor C 1906.

FIG. 23 shows the data structure of the virtual machine information generated by the virtual machine management unit 2243 and stored in the virtual machine information storage unit 445.

As shown in FIG. 23, the virtual machine information indicates virtual machine IDs 2301, the numbers of tasks 2302, and processor IDs 2303 that are associated with each other, similarly to the virtual machine information in Embodiment 1.

Returning again to FIG. 22, description of the functional structure of the modified virtual machine system 1900 continues.

The processor management unit 2244 is a partial modification of the processor management unit 444 in Embodiment 1. The processor management unit 2244 is connected to the virtual machine allocation unit 2242 and the processor information storage unit 446, and has functions 1a, 1b, 1c, and 1d described below, in addition to the functions 2 and 3 of the processor management unit 444.

Function 1a: At the start up of the hypervisor 2240, the processor management unit 2244 generates processor information such that the processors having the attribute of "active" are equal in number to the virtual machines targeted for execution (described below).

Here, the processors are set to have the attribute of "active" in the order of: the power saving processor A 1901, the power saving processor B 1902, the power saving processor C 1903, the high-performance processor A 1904, the high-performance processor B 1905, and the high-performance processor C 1906.

Function 1b: The processor management unit 2244 generates the processor information such that, when the attribute of at least one power saving processor is other than "active", the attribute of one of the at least one power saving processor is set to "standby", and further when the attribute of any power saving processor is neither "active" nor "standby", the attribute of the processor is set to "off".

Function 1c: The processor management unit 2244 generates the processor information such that, when the attribute of at least one high-performance processor is other than "active", the attribute of one of the at least one high-performance processor is set to "standby", and further when the attribute of any high-performance processor is neither "active" nor "standby", the attribute of the processor is set to "off".

Function 1d: The processor management unit 2244 stores, into the processor information storage unit 446, the processor information generated at the start up of the hypervisor 2240.

Figure 24:
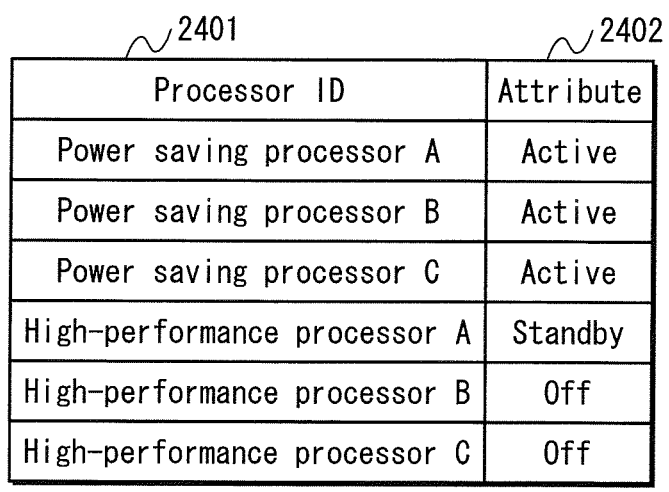
FIG. 24 shows the data structure of processor information.

FIG. 24 shows the data structure of the processor information generated by the processor management unit 2244 and stored in the processor information storage unit 446.

As shown in FIG. 24, the processor information indicates processor IDs 2401 and attributes 2402 that are associated with each other.

Each of the processor IDs 2401 is information for identifying a processor.

Each of the attributes 2402 is information indicating the attribute of a processor identified by a corresponding processor ID.

Each of the power saving processors A 1901 to C 1903 and the high-performance processors A 1904 to C 1906 is associated with one of three attributes, i.e., "active", "standby", and "off".

The attribute of "active" indicates that the processor causes a virtual machine to operate on the processor itself. If the processor is a power saving processor, the processor operates in a normal operation mode in which the supply voltage is 1.0 V and the operating frequency is 500 MHz. If the processor is a high-performance processor, the processor operates in a normal operation mode in which the supply voltage is 1.2 V and the operating frequency is 1 GHz.

The attribute of "standby" indicates that the processor does not cause a virtual machine to operate on the processor itself. If the processor is a power saving processor, the processor operates in a power saving mode in which the supply voltage is 0.8 V and the operating frequency is 250 MHz. If the processor is a high-performance processor, the processor operates in a power saving mode in which the supply voltage is 1.0 V and the operating frequency is 500 MHz.

The attribute of "off" indicates that the processor is not in operation, i.e., the processor is supplied with a supply voltage of 0 V.

Returning again to FIG. 22, description of the functional structure of the modified virtual machine system 1900 continues.

The virtual machine allocation unit 2242 is a partial modification of the virtual machine allocation unit 442 in Embodiment 1. The virtual machine allocation unit 2242 is connected to the virtual machine management unit 2243, the processor management unit 2244, the virtual machine information storage unit 445, and the processor information storage unit 446, and has the same function as the virtual machine allocation unit 442.

Although having the same function as the virtual machine allocation unit 442, the virtual machine allocation unit 2242 is different from the virtual machine allocation unit 442 in that: (i) two types of processors, i.e., the power saving processors and the high-performance processors are targeted for the processing by the virtual machine allocation unit 2242; and (ii) there are three attribute types for each processor, i.e., "active", "standby", and "off". Accordingly, the operations of the virtual machine allocation unit 2242 partially differ from the operations of the virtual machine allocation unit 442.

A difference between the operations of the virtual machine allocation unit 2242 and the operations of the virtual machine allocation unit 442 is described below.

With reference to the drawings, the following describes operations of the modified virtual machine system 1900 having the above structure.

<Operations>

Among operations by the modified virtual machine system 1900, the following describes characteristic operations, namely modified system startup processing and modified system update processing.

<Modified System Startup Processing>

The modified system startup processing is a partial modification of the system startup processing in Embodiment 1, and is processing of activating the modified virtual machine system 1900 when the modified virtual machine system 1900 is reset.

Figure 25:
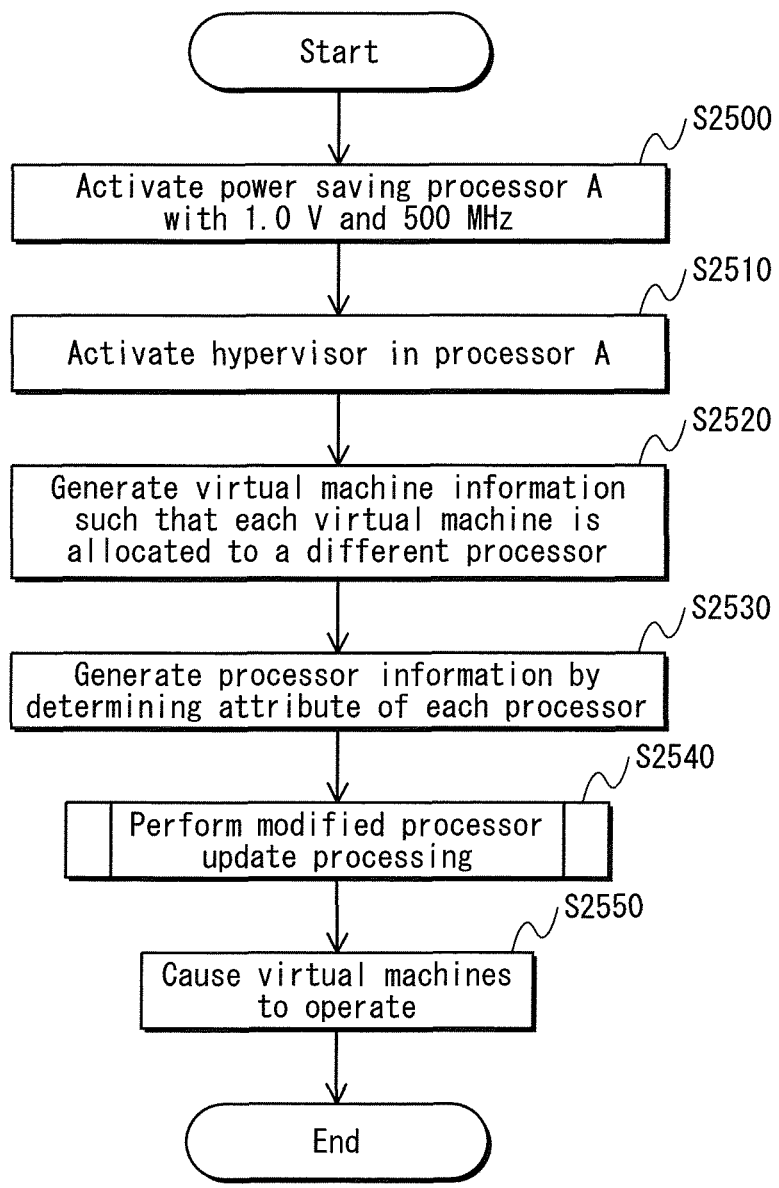
FIG. 25 is a flowchart showing modified system startup processing.

FIG. 25 is a flowchart showing the modified system startup processing.

When the modified virtual machine system 1900 is reset, the power control block 1911 supplies a supply voltage of 1.0 V to the power saving processor A 1901. Also, the clock control block 1912 supplies a clock signal of 500 MHz to the power saving processor A 1901. With the supply of the supply voltage and the clock signal, the power saving processor A 1901 is activated (step S2500).

After being activated, the power saving processor A 1901 activates the hypervisor 2240 (step S2510).

After the hypervisor 2240 is activated, the virtual machine management unit 2243 generates the virtual machine information such that each of the virtual machines targeted for execution is associated with a different processor, and stores the virtual machine information thus generated into the virtual machine information storage unit 445 (step S2520).

Here, the virtual machines targeted for execution are allocated to the processors in order of: the power saving processor A 1901, the power saving processor B 1902, the power saving processor C 1903, the high-performance processor A 1904, the high-performance processor B 1905, and the high-performance processor C 1906. Also, information indicating "0", which is an initial value, is assigned to each of the numbers of tasks 2302 in the generated virtual machine information.

When the processing of step S2520 is completed, the processor management unit 2244 generates the processor information such that: (i) the attribute of each of the processors associated with the virtual machines targeted for execution is set to "active"; (ii) when the attribute of at least one power saving processor is other than "active", the attribute of one of the at least one power saving processor is set to "standby"; (iii) when the attribute of any power saving processor is neither "active" nor "standby", the attribute of the processor is set to "off"; (iv) when the attribute of at least one high-performance processor is other than "active", the attribute of one of the at least one high-performance processor is set to "standby"; and (v) when the attribute of any high-performance processor is neither "active" nor "standby", the attribute of the processor is set to "off". Then, the processor management unit 2244 stores the processor information thus generated into the processor information storage unit 446 (step S2530).

When the processing of step S2530 is completed, the processor management unit 2244 performs the modified processor update processing for each of the processors other than the power saving processor A 1901, based on the processor information stored in the processor information storage unit 446 (step S2540).

Figure 26:
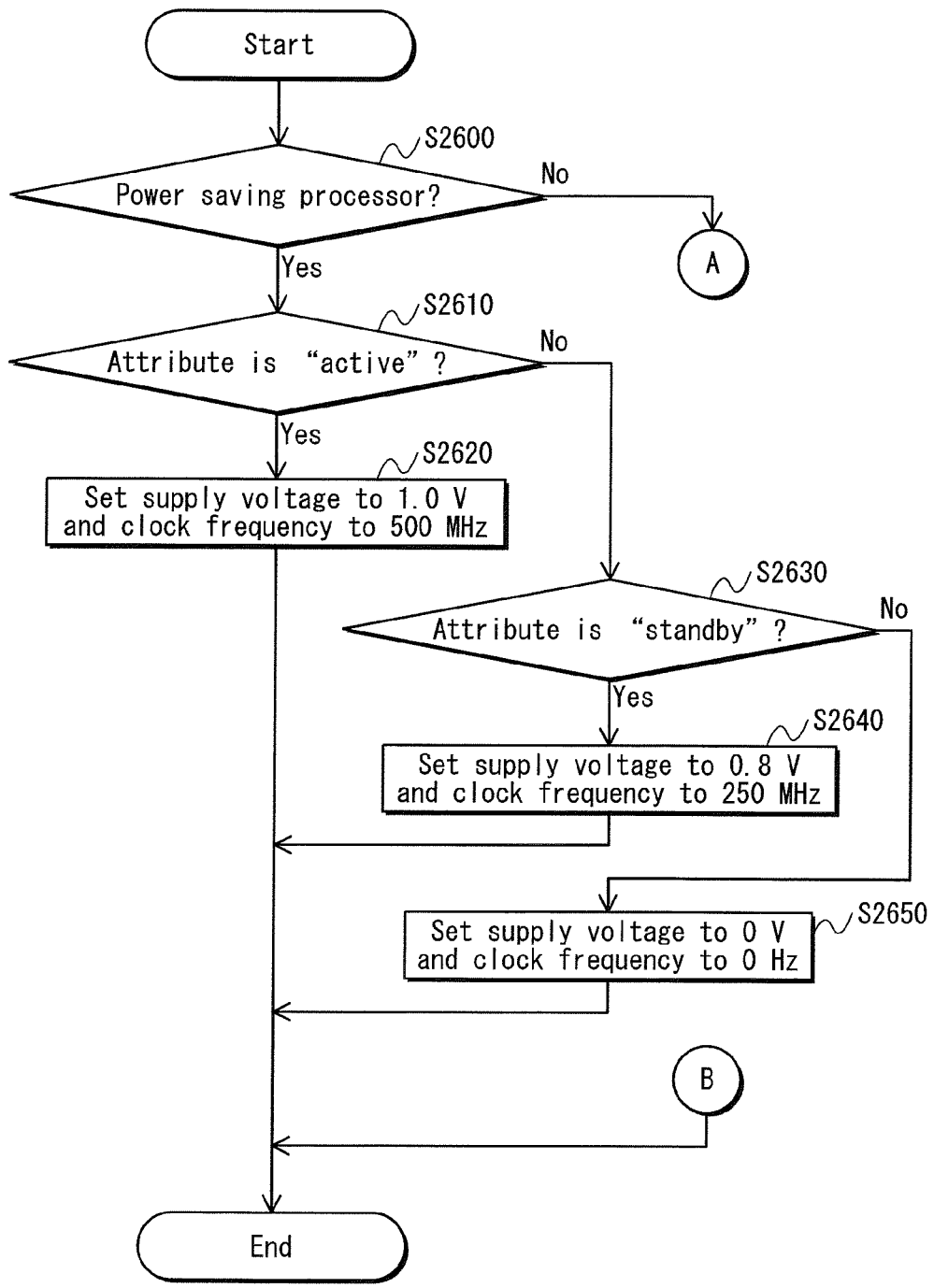
FIG. 26 is flowchart 1 showing modified processor update processing.
Figure 27:
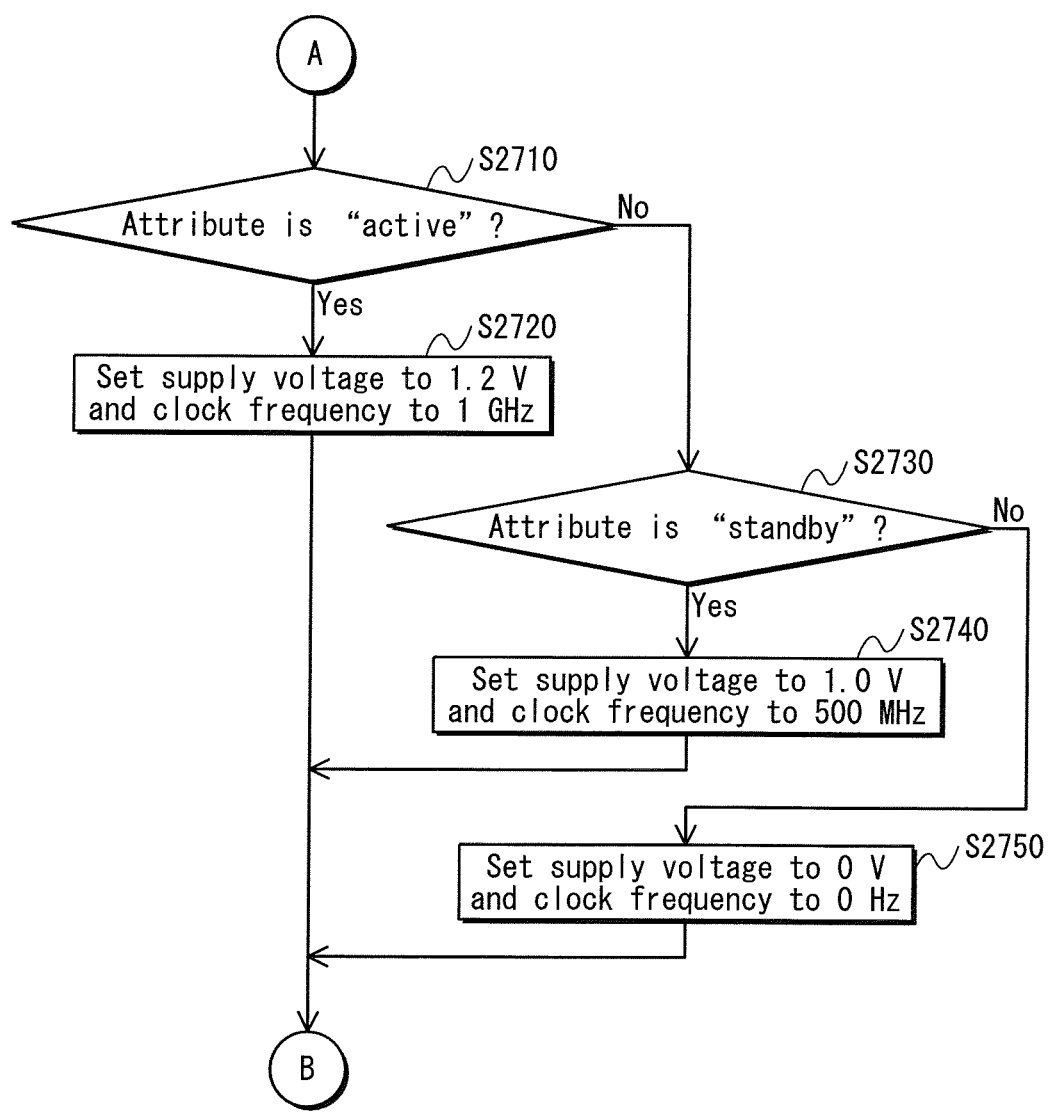
FIG. 27 is flowchart 2 showing the modified processor update processing.

FIGS. 26 and 27 are flowcharts showing the modified processor update processing performed by the processor management unit 2244.

When the modified processor update processing is started, the processor management unit 2244 checks whether a target processor is a power saving processor (step S2600).

If the target processor is a power saving processor in step S2600 (step S2600: Yes), the processor management unit 2244 checks whether the current attribute of the target processor is "active" (step S2610).

If the current attribute of the target processor is "active" in step S2610 (step S2610: Yes), the processor management unit 2244 changes the supply voltage supplied to the processor to be 1.0 V, and changes the frequency of a clock signal supplied to the processor to be 500 MHz (step S2620).

If the current attribute of the target processor is not "active" in step S2610 (step S2610: No), the processor management unit 2244 checks whether the current attribute of the target processor is "standby" (step S2630).

If the current attribute of the target processor is "standby" in step S2630 (step S2630: Yes), the processor management unit 2244 changes the supply voltage supplied to the processor to be 0.8 V, and changes the frequency of a clock signal supplied to the processor to be 250 MHz (step S2640).

If the current attribute of the target processor is not "standby" in step S2630 (step S2630: No), the processor management unit 2244 changes the supply voltage supplied to the processor to be 0 V, and changes the frequency of a clock signal supplied to the processor to be 0 Hz (step S2650).

If the target processor is not a power saving processor or, in other words, is a high-performance processor in step S2600 (step S2600: No), the processor management unit 2244 checks whether the current attribute of the target processor is "active" (step S2710).

If the current attribute of the target processor is "active" in step S2710 (step S2710: Yes), the processor management unit 2244 changes the supply voltage supplied to the processor to be 1.2 V, and changes the frequency of a clock signal supplied to the processor to be 1 GHz (step S2720).

If the current attribute of the target processor is not "active" in step S2710 (step S2710: No), the processor management unit 2244 checks whether the current attribute of the target processor is "standby" (step S2730).

If the current attribute of the target processor is "standby" in step S2730 (step S2730: Yes), the processor management unit 2244 changes the supply voltage supplied to the processor to be 1.0 V, and changes the frequency of a clock signal supplied to the processor to be 500 MHz (step S2740).

If the current attribute of the target processor is not "standby" in step S2730 (step S2730: No), the processor management unit 2244 changes the supply voltage supplied to the processor to be 0 V, and changes the frequency of a clock signal supplied to the processor to be 0 Hz (step S2750).

The processor management unit 2244 ends the modified processor update processing in any of the following cases: the processing of step S2620 is completed; the processing of step S2640 is completed; the processing of step S2650 is completed; the processing of step S2720 is completed; the processing of step S2740 is completed; and the processing of step S2750 is completed.

When the processing of step S2540 (i.e., modified processor update processing) is completed, the virtual machine allocation unit 2242 causes the virtual machines to operate on the processors associated with said virtual machines, based on the virtual machine information stored in the virtual machine information storage unit 445 (step S2550).

When the processing of step S2550 is completed, the modified virtual machine system 1900 ends the modified system startup processing.

<Modified System Update Processing>

The modified system update processing is a partial modification of the system update processing in Embodiment 1, and is processing of dynamically changing the attribute of each processor, based on a change in the number of tasks existing in each task queue managed by the OS operating in each virtual machine, and dynamically changing the allocation of the virtual machines to the processors.

Figure 28:
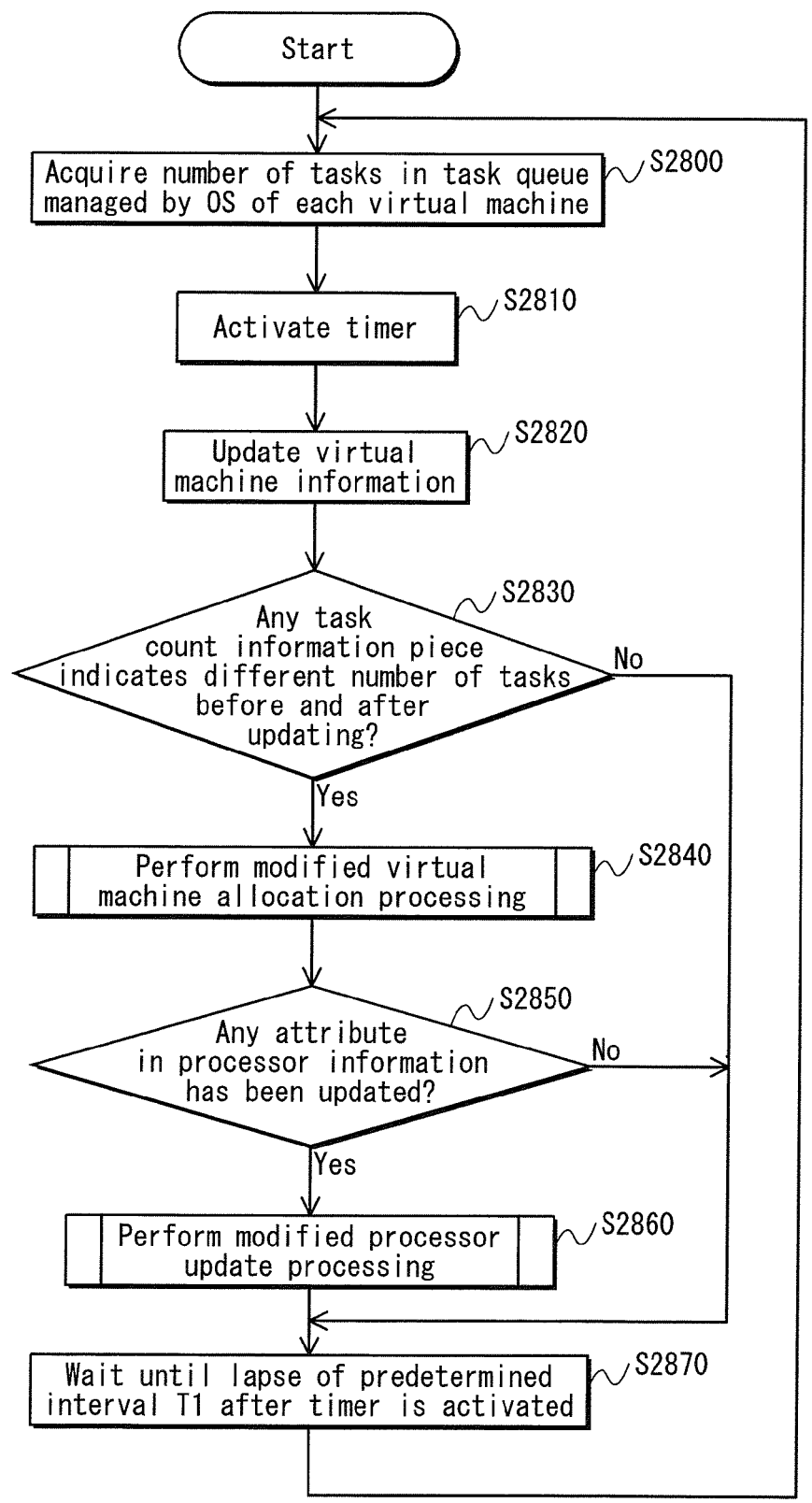
FIG. 28 is a flowchart showing modified system update processing.

FIG. 28 is a flowchart showing the modified system update processing.

Steps S2800, S2810, S2820, and S2830 in the modified system update processing are the same as steps S800, S810, S820, and S830 in the system update processing (see FIG. 8) in Embodiment 1. Accordingly, description of steps S2800, S2810, S2820, and S2830 is omitted here.

If the number of tasks before updating is different from the number of tasks after updating in regard to any of the task count information pieces in step S2830 (step S2830: Yes), the virtual machine management unit 2243 outputs, to the virtual machine allocation unit 2242, the virtual machine ID corresponding to the task count information piece indicating a different number of tasks before and after updating. Subsequently, the modified virtual machine system 1900 starts modified virtual machine allocation processing (step S2840).

Figure 29:
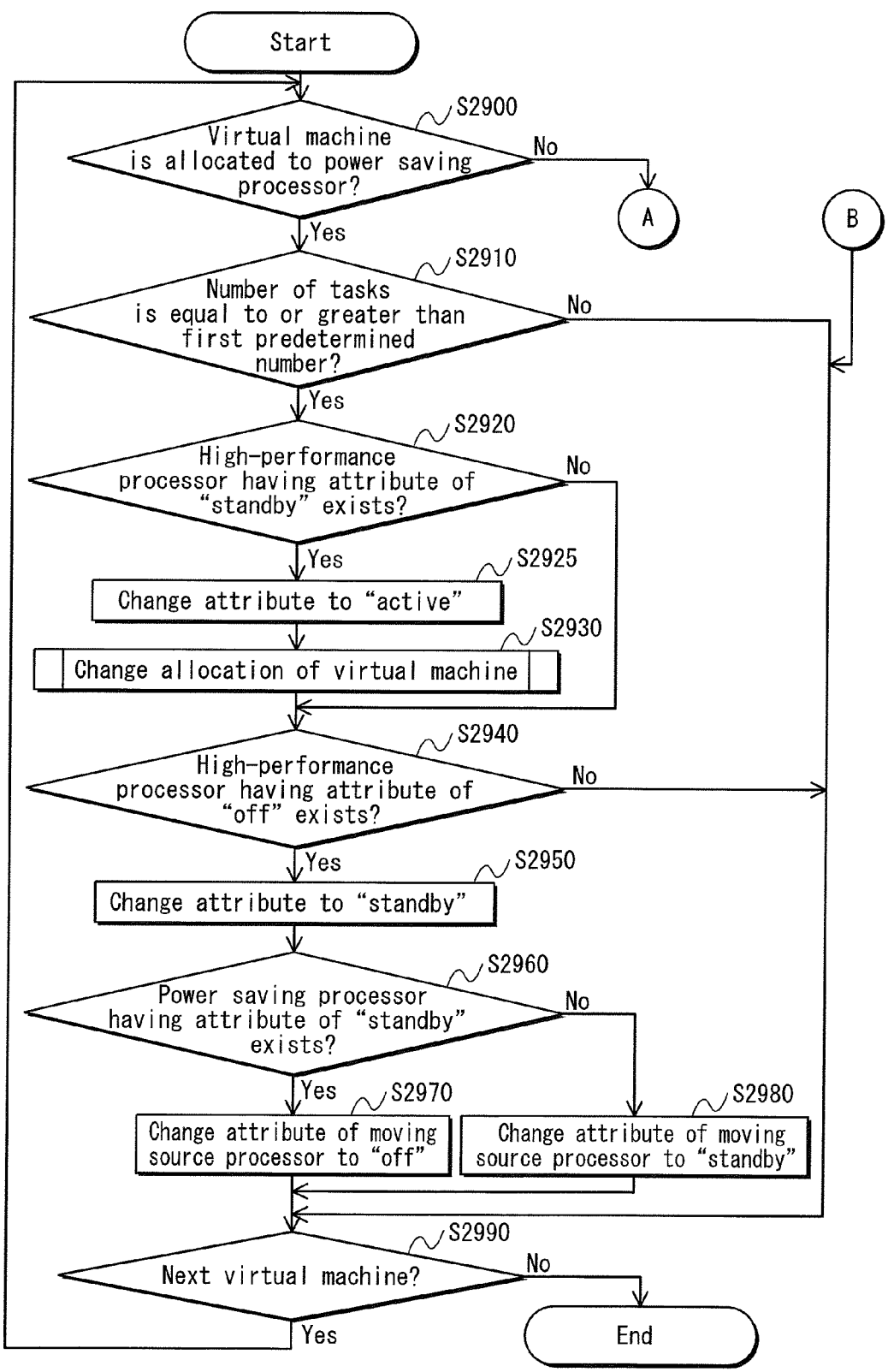
FIG. 29 is flowchart 1 showing modified virtual machine allocation processing.
Figure 30:
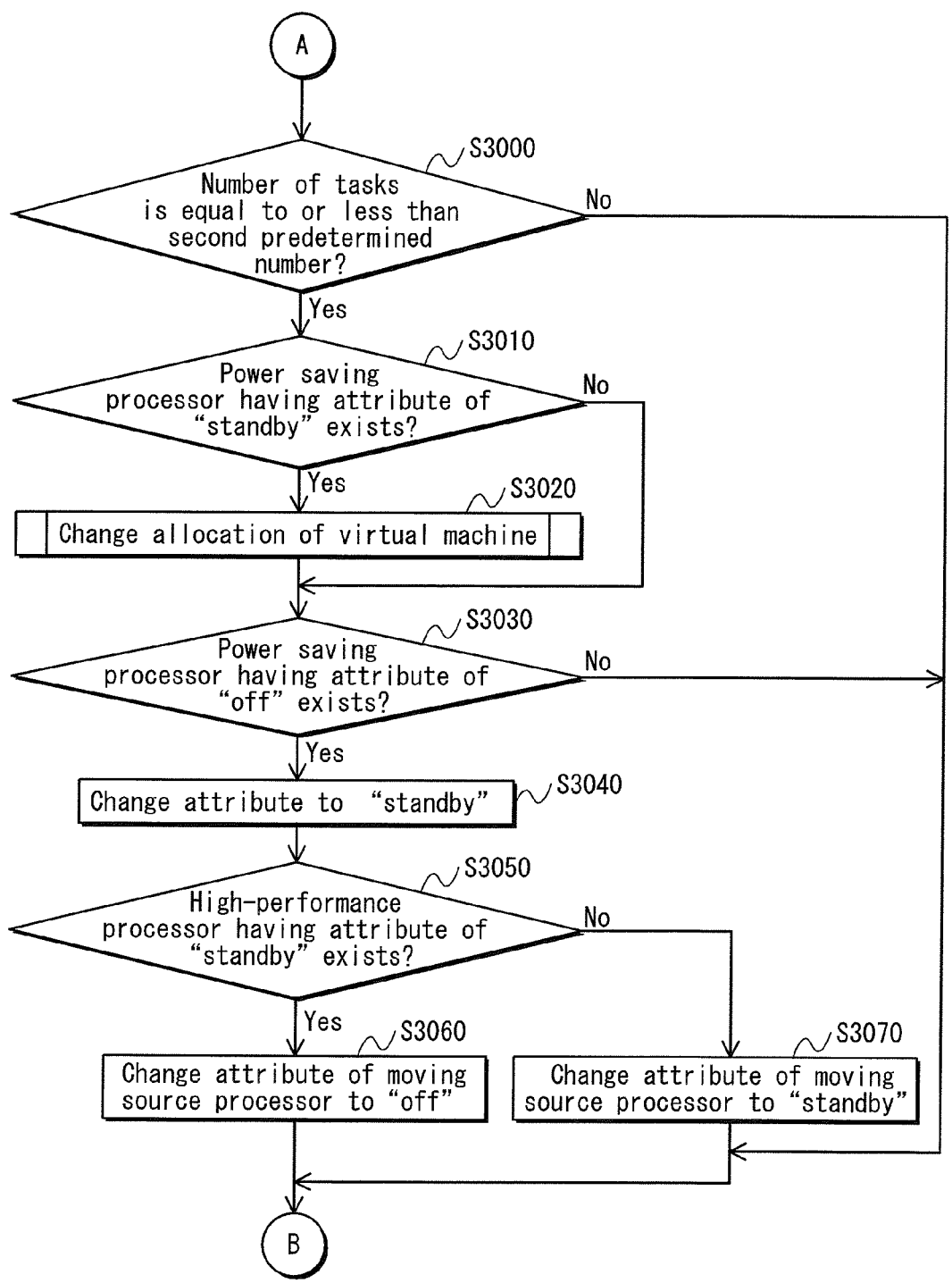
FIG. 30 is flowchart 2 showing the modified virtual machine allocation processing.

FIGS. 29 and 30 are each a flowchart showing the modified virtual machine allocation processing performed by the modified virtual machine system 1900.

Upon receiving one or more virtual machine IDs each corresponding to a different number of tasks before and after updating, the virtual machine allocation unit 2242 selects one virtual machine ID from among the one or more virtual machine IDs thus received.

After selecting one virtual machine ID, the virtual machine allocation unit 2242 reads the virtual machine information stored in the virtual machine information storage unit 445, and checks whether the processor on which the virtual machine identified by the selected virtual machine ID is operating is a power saving processor (step S2900).

If the processor on which the virtual machine identified by the selected virtual machine ID is operating is a power saving processor in step S2900 (step S2900: Yes), the virtual machine allocation unit 2242 checks whether the number of tasks corresponding to the virtual machine is equal to or greater than a first predetermined number (such as 30) (step S2910).

If the number of tasks is equal to or greater than the first predetermined number (such as 30) in step S2910 (step S2910: Yes), the virtual machine allocation unit 2242 checks whether a high-performance processor having the attribute of "standby" exists (step S2920).

If a high-performance processor having the attribute of "standby" exists in step S2920 (step S2920: Yes), the virtual machine allocation unit 2242 causes the processor management unit 2244 to update the processor information stored in the processor information storage unit 446, such that the attribute of the high-performance processor is changed from "standby" to "active" (step S2925).

Upon completion of step S2925, the virtual machine allocation unit 2242 changes the processor to which the virtual machine identified by the selected virtual machine ID is allocated to operate, from the processor to which the virtual machine is currently allocated to operate (hereinafter "moving source processor") to the processor having the attribute of "standby", which has been found to exist in step S2920 (hereinafter "moving destination processor") (step S2930: modified virtual machine allocation change processing).

Figure 31:
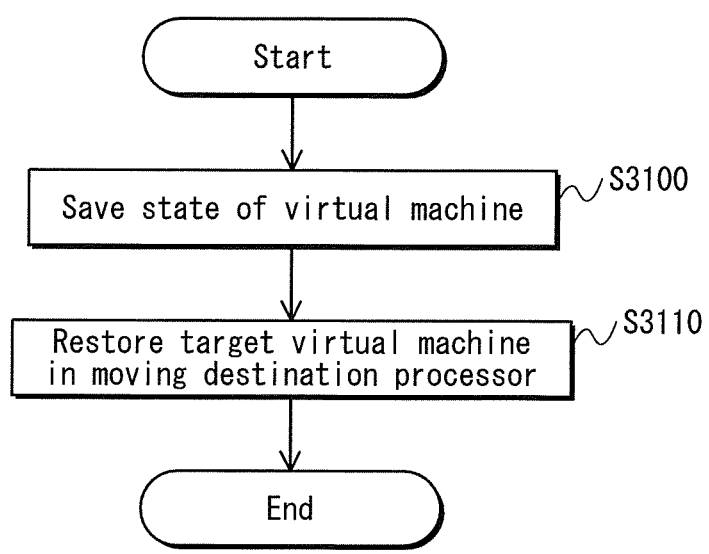
FIG. 31 is a flowchart showing modified virtual machine allocation change processing.

FIG. 31 is a flowchart showing the modified virtual machine allocation change processing performed by the modified virtual machine system 1900.

When the modified virtual machine system 1900 starts the modified virtual machine allocation change processing, the virtual machine allocation unit 2242 saves the state of a target virtual machine in the moving source processor (i.e., a data set necessary for restoring the processing of the virtual machine, such as data stored in each register) into a predetermined area of the RAM 114 (step S3100), and restores the target virtual machine in the moving destination processor and causes the target virtual machine to operate (step S3110).

When the processing of step S3110 is completed, the modified virtual machine system 1900 ends the modified virtual machine allocation change processing.

Returning again to FIG. 29, description of the modified virtual machine allocation processing continues.

Upon completion of step S2930 or when a high-performance processor having the attribute of "standby" does not exist in step S2920 (step S2920: No), the virtual machine allocation unit 2242 checks whether a high-performance processor having the attribute of "off" exists (step S2940).

If a high-performance processor having the attribute of "off" exists in step S2940 (step S2940: Yes), the virtual machine allocation unit 2242 causes the processor management unit 2244 to update the processor information stored in the processor information storage unit 446, such that the attribute of the high-performance processor is changed from "off" to "standby" (step S2950).

Upon completion of step S2950, the virtual machine allocation unit 2242 checks whether a power saving processor having the attribute of "standby" exists (step S2960).

If a power saving processor having the attribute of "standby" exists in step S2960 (step S2960: Yes), the virtual machine allocation unit 2242 causes the processor management unit 2244 to update the processor information stored in the processor information storage unit 446, such that the attribute of the moving source processor is changed to "off" (step S2970).

If a power saving processor having the attribute of "standby" does not exist in step S2960 (step S2960: No), the virtual machine allocation unit 2242 causes the processor management unit 2244 to update the processor information stored in the processor information storage unit 446, such that the attribute of the moving source processor is changed to "standby" (step S2980).

If the processor on which the virtual machine identified by the selected virtual machine ID is operating is not a power saving processor in step S2900, i.e., the processor is a high-performance processor (step S2900: No), the virtual machine allocation unit 2242 checks whether the number of tasks corresponding to the virtual machine is equal to or less than a second predetermined number (such as 25) (step S3000).

If the number of tasks is equal to or less than the second predetermined number (such as 25) in step S3000 (step S3000: Yes), the virtual machine allocation unit 2242 checks whether a power saving processor having the attribute of "standby" exists (step S3010).

If a power saving processor having the attribute of "standby" exists in step S3010 (step S3010: Yes), the virtual machine allocation unit 2242 performs the modified virtual machine allocation change processing (step S3020) with the moving source processor being the processor to which the virtual machine identified by the selected virtual machine ID is allocated to operate, and the moving destination processor being the power saving processor having the attribute of "standby" (step S3020).

Upon completion of step S3020 or when a power saving processor having the attribute of "standby" does not exist in step S3010 (step S3010: No), the virtual machine allocation unit 2242 checks whether a power saving processor having the attribute of "off" exists (step S3030).

If a power saving processor having the attribute of "off" exists in step S3030 (step S3030: Yes), the virtual machine allocation unit 2242 causes the processor management unit 2244 to update the processor information stored in the processor information storage unit 446, such that the attribute of the power saving processor is changed from "off" to "standby" (step S3040).

Upon completion of step S3040, the virtual machine allocation unit 2242 checks whether a high-performance processor having the attribute of "standby" exists (step S3050).

If a high-performance processor having the attribute of "standby" exists in step S3050 (step S3050: Yes), the virtual machine allocation unit 2242 causes the processor management unit 2244 to update the processor information stored in the processor information storage unit 446, such that the attribute of the moving source processor is changed to "off" (step S3060).

If a high-performance processor having the attribute of "standby" does not exist in step S3050 (step S3050: No), the virtual machine allocation unit 2242 causes the processor management unit 2244 to update the processor information stored in the processor information storage unit 446, such that the attribute of the moving source processor is changed to "standby" (step S3070).

The virtual machine allocation unit 2242 checks whether a virtual machine ID yet to be selected exists among the received virtual machine IDs (step S2990 in FIG. 29) in any of the following cases: the number of tasks is not equal to nor greater than the first predetermined number (such as 30) in step S2910 (step S2910: No); a high-performance processor having the attribute of "off" does not exist in step S2940 (step S2940: No); the processing of step S2970 is completed; the processing of step S2980 is completed; the number of tasks is not equal to nor less than the second predetermined number in step S3000 (such as 25 (step S3000: No); a power saving processor having the attribute of "off" does not exist in step S3030 (step S3030: No); the processing of step S3060 is completed; and the processing of step S3070 is completed.

If one or more virtual machine IDs yet to be selected exist in step S2990 (step S2990: Yes), the virtual machine allocation unit 2242 selects one virtual machine ID from among the one or more virtual machine IDs yet to be selected, returns to step S2900, and performs the processing from step S2900 onward.

If a virtual machine ID yet to be selected does not exist in step S2990 (step S2990: No), the modified virtual machine system 1900 ends the modified virtual machine allocation processing.

Returning again to FIG. 28, description of the modified system update processing continues.

Upon completion of the processing in step S2840, the processor management unit 2244 checks whether the attribute of any processor, from among the processors indicated in the processor information stored in the processor information storage unit 446, has been updated via the virtual machine allocation processing of step S2840 (step S2850).

If the attribute of any processor in the processor information has been updated in step S2850 (step S2850: Yes), the processor management unit 2244 performs processor update processing (see FIGS. 26 and 27) for each processor whose attribute has been updated (step S2860).

The load monitoring unit 441 waits until the lapse of time measured by the activated timer reaches a predetermined interval T1 (such as 100 μs) (step S2870) in any of the following cases: the number of tasks before updating is not different from the number of tasks after updating in regard to each of the task count information pieces in step S2830 (step S2830: No); the attributes of the processors in the processor information have not been updated in step S2850 (step S2850: No); and the processing of step S2860 is completed.

When the lapse of time measured by the timer reaches the predetermined interval T1 (such as 100 μs), the load monitoring unit 441 returns to step S2800, and performs the processing from step S2800 onward.

<Specific Example>

The following describes a specific example of the aforementioned modified system update processing.

This example describes the modified system update processing performed in the following situation. At time t1, the virtual machine information stored in the virtual machine information storage unit 445 is as shown in FIG. 23, and the processor information stored in the processor information storage unit 446 is as shown in FIG. 24. Also, the virtual machine A 411 is allocated to the power saving processor A 1901 to operate, the virtual machine B 412 is allocated to the power saving processor B 1902 to operate, and the virtual machine C 413 is allocated to the power saving processor C 1903 to operate. Further, the high-performance processor A 1904 is activated in the power saving mode and stands by in preparation for a new allocation of a virtual machine, and the high-performance processor B 1905 and the high-performance processor C 1906 are not supplied with power (see FIG. 22). Then, at time t2 given that all the above are satisfied at time t1, the number of tasks existing in the task queue managed by the third OS 423 is changed from five to forty.

After time t2, when the first timing arrives at which the load monitoring unit 441 acquires the number of tasks existing in the task queue managed by the OS of each virtual machine, the load monitoring unit 441 acquires the number of tasks for each OS and activates the timer, and the virtual machine management unit 2243 updates the virtual machine information (steps S2800 to S2820).

Figure 32:
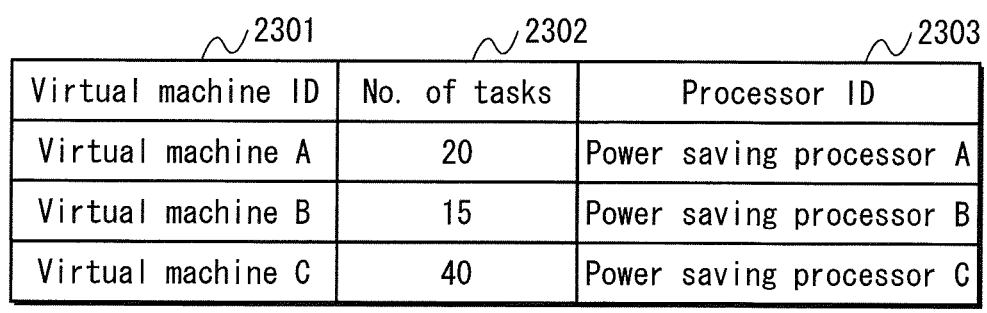
FIG. 32 shows the data structure of virtual machine information.

The virtual machine information thus updated is as shown in FIG. 32.

Since the number of tasks of the virtual machine C 413 is changed from five to forty (step S2830: Yes), the modified virtual machine system 1900 performs the modified virtual machine allocation processing (step S2840).

The following conditions are satisfied: the processor on which the virtual machine C 413 is operating is a power saving processor (see FIG. 32, step S2900: Yes); the number of tasks is equal to or greater than the first predetermined number (such as 30) (step S2910: Yes); and the high-performance processor A 1904 has the attribute of "standby" (FIG. 24, step S2920: Yes). Accordingly, the virtual machine allocation unit 2242 updates the processor information by changing the attribute of the high-performance processor A 1904 to "active" (step S2925), and performs the modified virtual machine allocation change processing (step S2930).

The virtual machine allocation unit 2242 changes the state of the virtual machine C 413 from the state of being allocated to the power saving processor C 1903 to operate to the state of being allocated to the high-performance processor A 1904 to operate (steps S3100 to S3110).

Since the attribute of the high-performance processor B 1905 is "off" (step S2940), the virtual machine allocation unit 2242 updates the processor information by changing the attribute of the high-performance processor B 1905 to "standby" (step S2950). Also, since none of the power saving processors has the attribute of "standby" (step S2960: No), the virtual machine allocation unit 2242 updates the processor information by changing the attribute of the power saving processor C 1903 to "standby" (step S2980).

Since no other virtual machine has the number of tasks that has changed (step S2990: No), the virtual machine allocation unit 2242 ends the virtual machine allocation processing, and the processor management unit 2244 checks whether the attribute of any processor in the processor information has been updated (step S2850).

At this point, the processor information stored in the processor information storage unit 446 is as shown in FIG. 33, where the attributes of the power saving processor C 1903, the high-performance processor A 1904, and the high-performance processor B 1905 have been changed (step S2860: Yes).

Since the power saving processor C 1903 is a power saving processor (step S2600: Yes) and has the attribute of "standby" (step S2610: No, and step S2630: Yes), the processor management unit 2244 changes the supply voltage supplied to the power saving processor C 1903 from 1.0 V to 0.8 V, changes the frequency of a clock signal supplied to the power saving processor C 1903 from 500 MHz to 250 MHz (step S2640), and sets the mode of the power saving processor C 1903 to the power saving mode.

Since the high-performance processor A 1904 is a high-performance processor (step S2600: No) and has the attribute of "active" (step S2710: Yes), the processor management unit 2244 changes the supply voltage supplied to the high-performance processor A 1904 from 1.0 V to 1.2 V, changes the frequency of a clock signal supplied to the high-performance processor A 1904 from 500 MHz to 1 GHz (step S2720), and sets the mode of the high-performance processor A 1904 to the normal operation mode.

Figure 34:
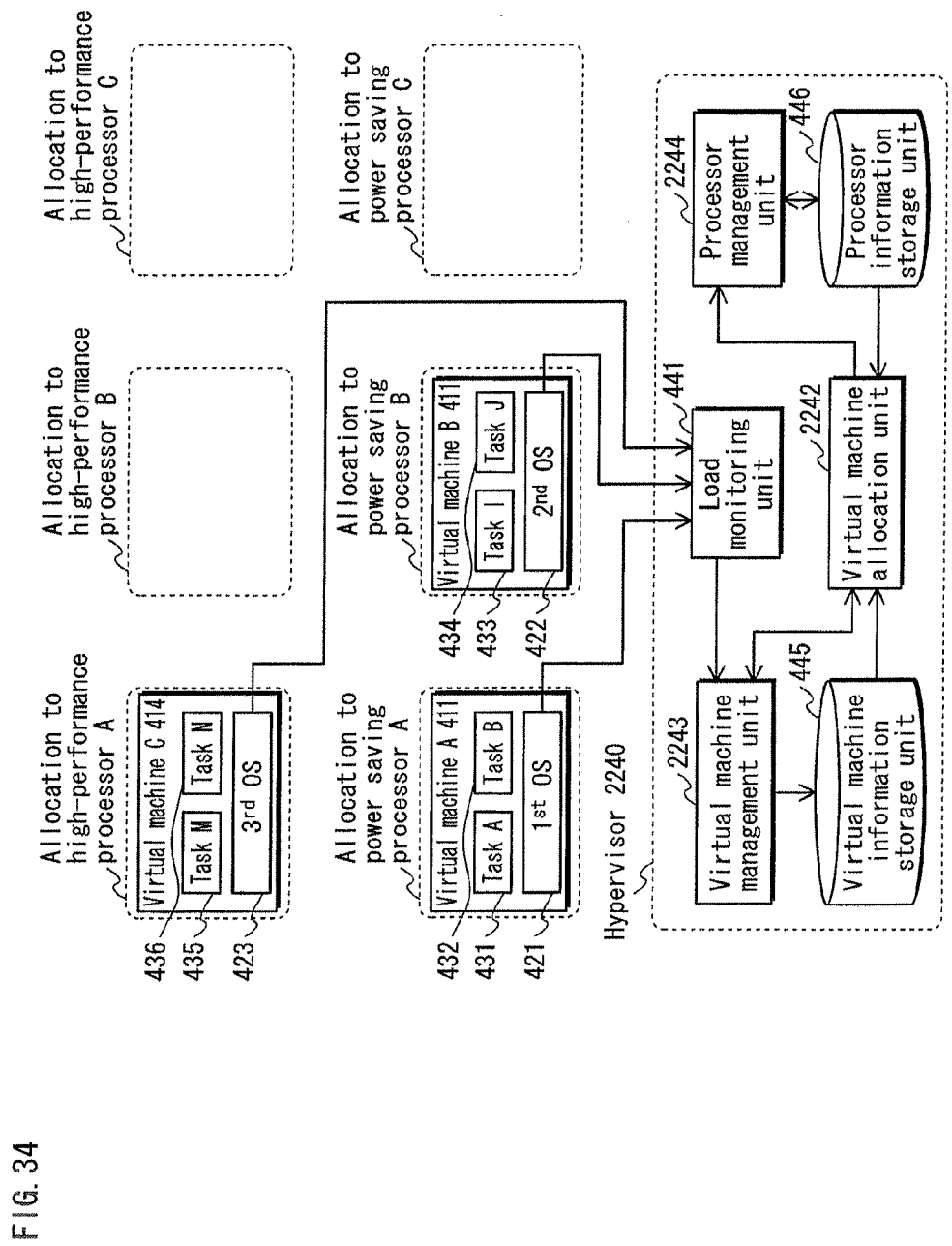
FIG. 34 is a functional structure diagram showing the main functional blocks constituting the modified virtual machine system 1900.

Since the high-performance processor B 1905 is a high-performance processor (step S2600: No) and has the attribute of "standby" (step S2710: No, and step S2730: Yes), the processor management unit 2244 supplies a supply voltage of 1.0 V to the high-performance processor B 1905, supplies a clock signal of 500 MHz to the high-performance processor B 1905, and activates the high-performance processor B 1905 in the power saving mode (see FIG. 34).

Thereafter, the load monitoring unit 441 waits until the lapse of time measured by the activated timer reaches the predetermined interval T1 (such as 100 μs) (step S2870).

<Summary>

According to the modified virtual machine system 1900 as described above, when the number of tasks of a virtual machine allocated to a power saving processor to operate becomes equal to or greater than the first predetermined number, the virtual machine can be allocated to a high-performance processor to operate, the high-performance processor having a higher processing capability than a power saving processor.

Also, according to the modified virtual machine system 1900 as described above, when the number of tasks of a virtual machine allocated to a high-performance processor to operate becomes equal to or less than the second predetermined number, the virtual machine can be allocated to a power saving processor to operate, the power saving processor consuming less power than a high-performance processor.

<Supplementary Remark>

As embodiments of the virtual machine system according to the present invention, examples of two virtual machine systems have been described in Embodiment 1 and Embodiment 2. The virtual machine system is not, however, limited to being exactly as described in the above embodiments, and may be modified as follows.

(1) According to Embodiment 1, the virtual machine system 100 includes four processors. However, the number of processors is not limited to four as long as the virtual machine system 100 includes a plurality of processors. For example, the number of processors may be three or ten.

(2) According to Embodiment 1, each processor operates with a supply voltage of 1.2 V and an operating frequency of 1 GHz in the normal operation mode, and operates with a supply voltage of 1.0 V and an operating frequency of 500 MHz in the power saving mode. However, each processor does not always need to operate in the aforementioned conditions as long as (i) the data processing capability thereof in the normal operation mode is no less than the data processing capability thereof in the power saving mode and (ii) the power consumption thereof in the normal operation mode is no less than the power consumption thereof in the power saving mode. For example, each processor may operate with a supply voltage of 1.5 V and an operating frequency of 200 MHz in the normal operation mode, and may operate with a supply voltage of 1.2 V and an operating frequency of 100 MHz in the power saving mode.

Furthermore, the supply voltage and the operating frequency in the normal operation mode may be the same as those in the power saving mode. In other words, each processor may operate with the same supply voltage and the same operating frequency regardless of whether in the normal operation mode or in the power saving mode.

(3) According to Embodiment 1, the virtual machine system 100 changes the attribute of each processor based on the number of tasks existing in each task queue managed by the OS operating in each virtual machine. However, the attribute of each processor does not always need to be changed based on the number of tasks, as long as it can be changed based on information usable as an indicator indicating a load of each virtual machine. For example, the attribute of each processor may be changed based on the number of tasks weighted depending on the type of each task or based on the type of each task.

(4) According to Embodiment 1, each virtual machine is allocated to one processor to operate. However, each virtual machine does not always need to be allocated to one processor as long as these virtual machines can be realized. For example, each one of the virtual machines may be allocated to two processors to operate.

(5) According to Embodiment 1, the virtual machine system 100 performs the following control when some of the processors do not have any virtual machines allocated thereto. That is, in preparation for the next time a virtual machine is newly allocated to a processor, the virtual machine system 100 supplies power to one of the processors that do not have any virtual machines allocated thereto so as to place the processor to be in a standby state, and does not supply power to the rest of the processors that do not have any virtual machines allocated thereto. However, the number of processors to be placed in a standby state is not limited to one as long as the number is not zero. For example, the virtual machine system 100 may perform control so as to cause two processors to be placed in a standby state. Alternatively, the number of processors to be placed in a standby state may change based on time. For example, the number of processors to be placed in a standby state may be two from 9 a.m. to 7 p.m., and may be one at any other time.

(6) According to Embodiment 1, when a processor having the attribute of "standby" exists and a given processor no longer has any virtual machine allocated thereto, the virtual machine system 100 sets the attribute of the given processor to "off". However, it is not limited to such, as long as at least one processor has the attribute of "standby". For example, a processor having the attribute of "standby" may be set to have the attribute of "off" and a processor no longer having any virtual machine allocated thereto may be set to have the attribute of "standby".

(7) According to Embodiment 1, the following circuits are integrated into the system LSI 110: the processor A 101; the processor B 102; the processor C 103; the processor D 104; the power control block 111; the clock control block 112; the ROM 113; the RAM 114; the hard disk device interface 115; the output device interface 116; the input device interface 117; and the internal bus 120. However, these circuits do not always need to be integrated into a single LSI, as long as functions to be realized by the system LSI 110 can in fact be realized. For example, each of the circuits may be integrated into a different integrated circuit.

(8) According to the examples of Embodiment 1, the first predetermined number is 30 and the second predetermined number is 25. However, the first and second predetermined numbers are not limited to these values, as long as the first predetermined number is equal to or greater than the second predetermined number. For example, the first predetermined number may be 100 and the second predetermined number may be 90, or alternatively, the first predetermined number and the second predetermined number may both be 40.

(9) According to Embodiment 1, when a processor causes a plurality of virtual machines to operate, the processor repeatedly and sequentially causes the virtual machines to operate by time sharing. However, the processor may use a method other than time sharing, as long as the processor can cause the plurality of virtual machines to operate. For example, the processor may have a multithread processing function which enables parallel execution of a plurality of threads, and may cause the plurality of virtual machines to operate in parallel, with use of the multithread processing function.

(10) According to Embodiment 1, a processor having the attribute of "standby" operates with a supply voltage of 1.0 V and an operating frequency of 500 MHz. However, as long as a supply voltage is sufficient for the operation of the processor having the attribute of "standby", the supply voltage does not always need to be 1.0 V and the operating frequency does not always need to be 500 MHz.

For example, a processor having the attribute of "standby" may be in a non-operation state with a supply voltage of 1.2 V and an operating frequency of 0 Hz, or alternatively, may be in an operation state with a supply voltage of 1.2 V and an operating frequency of 1 GHz.

(11) According to Embodiment 2, the number of power saving processors is the same as the number of high-performance processors. However, the number of power saving processors may be different from the number of high-performance processors as long as the number of power saving processors and the number of high-performance processors are each greater than one.

(12) According to Embodiment 2, the power saving processors and the high-performance processors have the same ISA. However, these processors do not necessarily have the same ISA.

In the case of executing an instruction not implemented in a different ISA, the instruction may be emulated to generate an emulated instruction by using a hypervisor or the like and the emulated instruction may be used instead.

(13) According to Embodiment 2, at the start up of the hypervisor 2240, the virtual machine management unit 2243 allocates the virtual machines targeted for execution to the processors in the order of: the power saving processor A 1901, the power saving processor B 1902, the power saving processor C 1903, the high-performance processor A 1904, the high-performance processor B 1905, and the high-performance processor C 1906. However, the order of allocation is not necessarily as such as long as the order is uniquely determined.

(14) According to Embodiment 1, the number of bits of the switch setting register 210 is eight. However, the number of bits does not always need to be eight, as long as the number of bits is sufficient for setting a supply voltage for each processor.

In the virtual machine system 100 according to Embodiment 1, when the number of processors is four and there are three types of supply voltages for the processors, the number of bits of the switch setting register 210 is eight. However, in the case of a virtual machine system that differs from the virtual machine system 100 in terms of the number of processors and the types of supply voltages, the number of bits of the switch setting register in the virtual machine system is of course determined by reflecting the number of processors and the types of supply voltages.

Similarly, according to Embodiment 2, the number of bits of the switch setting register 2010 is 12. However, the number of bits does not always need to be 12, as long as the number of bits is sufficient for setting a supply voltage for each processor.

Also, similarly to Embodiment 1, in the virtual machine system 1900 according to Embodiment 2, when the following conditions are satisfied: (i) the number of power saving processors is three; (ii) there are three types of supply voltages for the power saving processors; (iii) the number of high-performance processors is three; and (iv) there are three types of supply voltages for the high-performance processors, then the number of bits of the switch setting register 2010 is 12. However, in the case of a virtual machine system that differs from the virtual machine system 1900 in terms of the number of processors and the types of supply voltages, the number of bits of the switch setting register in the virtual machine system is of course determined by reflecting the number of processors and the types of supply voltages.

(15) According to Embodiment 1, the number of bits of the selector setting register 310 is eight. However, the number of bits does not always need to be eight, as long as the number of bits is sufficient for setting the frequency of a clock signal supplied to each processor.

In the virtual machine system 100 according to Embodiment 1, when the number of processors is four and there are three types of clock signals for the processors, the number of bits of the selector setting register 310 is eight. However, in the case of a virtual machine system that differs from the virtual machine system 100 in terms of the number of processors and the types of clock signals, the number of bits of the selector setting register in the virtual machine system is of course determined by reflecting the number of processors and the types of clock signals.

Similarly, according to Embodiment 2, the number of bits of the selector setting register 2110 is 12. However, the number of bits does not always need to be 12, as long as the number of bits is sufficient for setting the frequency of a clock signal supplied to each processor.

Also, similarly to Embodiment 1, in the virtual machine system 1900 according to Embodiment 2, when the following conditions are satisfied: (i) the number of power saving processors is three; (ii) there are three types of clock signals for the power saving processors; (iii) the number of high-performance processors is three; and (iv) there are three types of clock signals for the high-performance processors, then the number of bits of the selector setting register 2110 is 12. However, in the case of a virtual machine system that differs from the virtual machine system 1900 in terms of the number of processors and the types of clock signals, the number of bits of the selector setting register in the virtual machine system is of course determined by reflecting the number of processors and the types of clock signals.

(16) The following describes the structure of a virtual machine system relating to another embodiment of the present invention, modifications of the embodiment, and effects of the embodiment and the modifications.

(a) One embodiment of the present invention provides a virtual machine system including a plurality of processors and for causing a plurality of virtual machines to operate, the virtual machine system comprising: an allocation unit configured to allocate each virtual machine to any processor that is supplied with power; and a power supply unit configured to, when the allocation unit allocates a virtual machine to a processor that is supplied with power and does not have any virtual machine allocated thereto, and at least two processors are not supplied with power, supply power to at least one and less than all of the processors that are not supplied with power, and maintain a remaining one or more of the processors that are not supplied with power at a state of not being supplied with power.

According to the virtual machine system having the above structure, the following control is possible when the allocation unit allocates a virtual machine to a processor that is supplied with power and does not have any virtual machines allocated thereto. That is, in preparation for the next time a virtual machine is newly allocated to a processor, the power supply unit can supply power to a processor that is not supplied with power so as to cause the processor to be placed in a standby state.

Furthermore, among processors that do not have any virtual machines allocated thereto, processors other than the processor in the standby state for the next allocation of a virtual machine are not supplied with power.

This makes it possible to suppress power consumption while preventing degradation of the performance of the virtual machine system.

Figure 35:
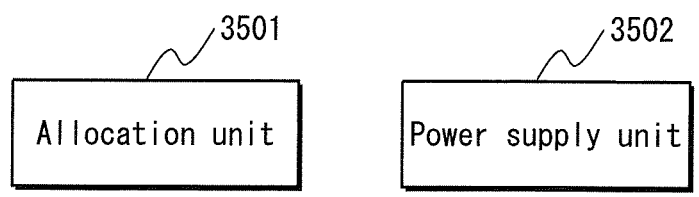
FIG. 35 is a schematic diagram showing an allocation unit 3501 and a power supply unit 3502 that are realized in a virtual machine system according to a modification.

FIG. 35 is a schematic diagram showing an allocation unit 3501 and a power supply unit 3502 that are realized on a virtual machine system including a plurality of processors and for causing a plurality of virtual machines to operate, according to the above modification.

The allocation unit 3501 allocates each virtual machine to any processor that is supplied with power. For example, the allocation unit 3501 is realized as one of the functions of the hypervisor 440 in Embodiment 1 (see FIG. 4).

When the allocation unit 3501 allocates a virtual machine to a processor that is supplied with power and does not have any virtual machine allocated thereto, and at least two processors are not supplied with power, the power supply unit 3502 supplies power to at least one and less than all of the processors that are not supplied with power, and maintains a remaining one or more of the processors that are not supplied with power at a state of not being supplied with power. For example, the power supply unit 3502 is realized as one of the functions of the hypervisor 440 in Embodiment 1.

(b) The virtual machine system may further comprise a clock supply unit configured to supply a clock signal only to each processor that is supplied with power.

With the above structure, processors that are not in operation are not supplied with clock signals. This makes it possible to suppress power consumption while preventing degradation of the performance of the virtual machine system.

(c) The virtual machine system may further comprise a clock control unit configured to control the clock signal for each processor that is supplied with power, such that a frequency of the clock signal supplied to a processor that is supplied with power and has a virtual machine allocated thereto is higher than a frequency of the clock signal supplied to a processor that is supplied with power and does not have any virtual machine allocated thereto.

With the above structure, the power consumption by a processor in a standby state can be lower than the power consumption by a processor that has a virtual machine allocated thereto. This makes it possible to suppress power consumption while preventing degradation of the performance of the virtual machine system.

(d) The virtual machine system may further comprise a voltage control unit configured to control a supply voltage to each processor that is supplied with power, such that a processor that is supplied with power and has a virtual machine allocated thereto has a supply voltage higher than a processor that is supplied with power and does not have any virtual machine allocated thereto.

With the above structure, the power consumption by a processor in a standby state can be lower than the power consumption by a processor that has a virtual machine allocated thereto. This makes it possible to suppress power consumption while preventing degradation of the performance of the virtual machine system.

(e) In the virtual machine system, when a processor that is supplied with power and has a virtual machine allocated thereto is placed in a state of not having any virtual machine allocated thereto, the power supply unit may further stop supplying power to at least one of processors that are supplied with power and do not have any virtual machine allocated thereto.

With the above structure, the number of processors in a standby state can be reduced, thus enabling suppression of power consumption.

(f) In the virtual machine system, when the following conditions are satisfied: (i) a first virtual machine and a second virtual machine have been allocated to a first processor; (ii) processing of the first virtual machine satisfies a predetermined condition; and (iii) a second processor exists that is supplied with power and does not have any virtual machine allocated thereto, then the allocation unit may reallocate the first virtual machine from the first processor to the second processor.

With the above structure, if a virtual machine having a heavy load exists among virtual machines allocated to a processor to operate, the virtual machine can be reallocated to another processor and caused to operate exclusively on the processor.

(g) In the virtual machine system, when the following conditions are satisfied: (i) a first virtual machine has been allocated to a first processor that does not have any virtual machine other than the first virtual machine allocated thereto; (ii) processing of the first virtual machine satisfies a predetermined condition; and (iii) a second processor exists that has a virtual machine allocated thereto and processing of the virtual machine satisfies a second predetermined condition, then the allocation unit may reallocate the first virtual machine from the first processor to the second processor.

With the above structure, if the load of a virtual machine that operates exclusively on a processor becomes small, the virtual machine can share a processor with another virtual machine and operate on the processor together with the other virtual machine.

(h) In the virtual machine system, the plurality of processors may include type 1 processors and type 2 processors having a lower processing capability and a lower power consumption than the type 1 processors. For each virtual machine allocated to either type of processors between the type 1 processors and the type 2 processors, when processing of the virtual machine satisfies a predetermined condition, the allocation unit may reallocate the virtual machine satisfying the predetermined condition to one of the other type of processors. When the allocation unit allocates a virtual machine to a type 1 processor that is supplied with power and does not have any virtual machine allocated thereto, and at least two type 1 processors are not supplied with power, the power supply unit may supply power to at least one and less than all of the type 1 processors that are not supplied with power, and may maintain a remaining one or more of the type 1 processors that are not supplied with power at a state of not being supplied with power. When the allocation unit allocates a virtual machine to a type 2 processor that is supplied with power and does not have any virtual machine allocated thereto, and at least two type 2 processors are not supplied with power, the power supply unit may supply power to at least one and less than all of the type 2 processors that are not supplied with power, and may maintain a remaining one or more of the type 2 processors that are not supplied with power at a state of not being supplied with power.

The above structure allows for a finer adjustment of a trade-off between performance and power consumption for the virtual machine system, as compared to a virtual machine system including processors of a single type.

(i) In the virtual machine system, when a type 1 processor that is supplied with power and has a virtual machine allocated thereto is placed in a state of not having any virtual machine allocated thereto, the power supply unit may further stop supplying power to at least one of type 1 processors that are supplied with power and do not have any virtual machine allocated thereto. Also, when a type 2 processor that is supplied with power and has a virtual machine allocated thereto is placed in a state of not having any virtual machine allocated thereto, the power supply unit may further stop supplying power to at least one of type 2 processors that are supplied with power and do not have any virtual machine allocated thereto.

With the above structure, the number of type 1 processors in a standby state and the number of type 2 processors in a standby state can be reduced, thus enabling suppression of power consumption.

The present invention can be widely used in a system that includes a plurality of processors and that is for causing a plurality of virtual machines to operate.

REFERENCE SIGNS LIST 100 virtual machine system
101 processor A
102 processor B
103 processor C
104 processor D
110 system LSI
111 power control block
112 clock control block
113 ROM
114 RAM
115 hard disk device interface
116 output device interface
117 input device interface
120 internal bus
130 hard disk device
131 output device
132 input device

The invention claimed is:

1. A virtual machine system including a plurality of processors and for causing a plurality of virtual machines to operate, each processor being placed in any of: a first state in which the processor operates with a power supply; a second state in which the processor operates with a power supply lower than in the first state; and a third state in which the processor is not in operation without any power supply, the virtual machine system comprising:
   an allocation unit configured to allocate each virtual machine to any processor that is supplied with power; and
   a power supply unit configured to, when the allocation unit allocates a virtual machine to a processor that does not have any virtual machine allocated thereto and is in the second state and at least two processors are in the third state, supply power to the processor allocated to the virtual machine so as to cause the processor to be placed in the first state and supply power to at least one and less than all of the processors in the third state so as to cause the at least one and less than all of the processors to be placed in the second state, and maintain a remaining one or more of the processors in the third state,
   wherein the plurality of processors includes type 1 processors and type 2 processors having a lower processing capability and a lower power consumption than the type 1 processors, and
   for each virtual machine allocated to either type of processors between the type 1 processors and the type 2 processors, when processing of the virtual machine satisfies a predetermined condition, the allocation unit reallocates the virtual machine satisfying the predetermined condition to one of the other type of processors.

2. The virtual machine system of claim 1, further comprising
   a clock supply unit configured to supply a clock signal only to each processor that is supplied with power.

3. The virtual machine system of claim 2, further comprising
   a clock control unit configured to control the clock signal for each processor that is supplied with power, such that a frequency of the clock signal supplied to a processor that is in the first state and has a virtual machine allocated thereto is higher than a frequency of the clock signal supplied to a processor that is in the second state and does not have any virtual machine allocated thereto.

4. The virtual machine system of claim 1, further comprising
   a voltage control unit configured to control a supply voltage to each processor that is supplied with power, such that a processor that is in the first state and has a virtual machine allocated thereto has a supply voltage higher than a processor that is in the second state and does not have any virtual machine allocated thereto.

5. The virtual machine system of claim 1, wherein
   the power supply unit is further configured to, when a processor that is in the first state and has a virtual machine allocated thereto is placed in a state of not having any virtual machine allocated thereto, stop supplying power to at least one of processors that are in the second state and do not have any virtual machine allocated thereto.

6. The virtual machine system of claim 1, wherein
   when the following conditions are satisfied: (i) a first virtual machine and a second virtual machine have been allocated to a first processor; (ii) processing of the first virtual machine satisfies a predetermined condition; and (iii) a second processor exists that is in the second state and does not have any virtual machine allocated thereto, then the allocation unit reallocates the first virtual machine from the first processor to the second processor.

7. The virtual machine system of claim 6, wherein
   the allocation unit reallocates the first virtual machine to the second processor such that the first virtual machine is caused to operate exclusively on the second processor.

8. The virtual machine system of claim 1, wherein
   when the following conditions are satisfied: (i) a first virtual machine has been allocated to a first processor that does not have any virtual machine other than the first virtual machine allocated thereto; (ii) processing of the first virtual machine satisfies a predetermined condition; and (iii) a second processor exists that has a virtual machine allocated thereto and processing of the virtual machine satisfies a second predetermined condition, then the allocation unit reallocates the first virtual machine from the first processor to the second processor.

9. The virtual machine system of claim 1, wherein
   when the allocation unit allocates a virtual machine to a type 1 processor that is in the second state and does not have any virtual machine allocated thereto, and at least two type 1 processors are in the third state, the power supply unit supplies power to at least one and less than all of the type 1 processors in the third state so as to cause the at least one and less than all of the type 1 processors to be placed in the second state, and maintains a remaining one or more of the type 1 processors in the third state, and
   when the allocation unit allocates a virtual machine to a type 2 processor that is in the second state and does not have any virtual machine allocated thereto, and at least two type 2 processors are in the third state, the power supply unit supplies power to at least one and less than all of the type 2 processors in the third state so as to cause the at least one and less than all of the type 2 processors to be placed in the second state, and maintains a remaining one or more of the type 2 processors in the third state.

10. The virtual machine system of claim 9, wherein the power supply unit is further configured to, when a type 1 processor that is in the first state and has a virtual machine allocated thereto is placed in a state of not having any virtual machine allocated thereto, stop supplying power to at least one of type 1 processors that are in the second state and do not have any virtual machine allocated thereto, and when a type 2 processor that is in the first state and has a virtual machine allocated thereto is placed in a state of not having any virtual machine allocated thereto, stop supplying power to at least one of type 2 processors that are in the second state and do not have any virtual machine allocated thereto.

11. An integrated circuit including a plurality of processors and for causing a plurality of virtual machines to operate, each processor being placed in any of: a first state in which the processor operates with a power supply; a second state in which the processor operates with a power supply lower than in the first state; and a third state in which the processor is not in operation without any power supply, the integrated circuit comprising:

an allocation unit configured to allocate each virtual machine to any processor that is supplied with power; and a power supply unit configured to, when the allocation unit allocates a virtual machine to a processor that does not have any virtual machine allocated thereto and is in the second state and at least two processors are in the third state, supply power to the processor allocated to the virtual machine so as to cause the processor to be placed in the first state and supply power to at least one and less than all of the processors in the third state so as to cause the at least one and less than all of the processors to be placed in the second state, and maintain a remaining one or more of the processors in the third state, wherein the plurality of processors includes type 1 processors and type 2 processors having a lower processing capability and a lower power consumption than the type 1 processors, and for each virtual machine allocated to either type of processors between the type 1 processors and the type 2 processors, when processing of the virtual machine satisfies a predetermined condition, the allocation unit reallocates the virtual machine satisfying the predetermined condition to one of the other type of processors.

12. A control method for controlling a virtual machine system, the virtual machine system including a plurality of processors and for causing a plurality of virtual machines to operate, each processor being placed in any of: a first state in which the processor operates with a power supply; a second state in which the processor operates with a power supply lower than in the first state; and a third state in which the processor is not in operation without any power supply, the control method comprising:

an allocation step of allocating each virtual machine to any processor that is supplied with power; and a power supply step of, when the allocation step allocates a virtual machine to a processor that does not have any virtual machine allocated thereto and is in the second state and at least two processors are in the third state, supplying power to the processor allocated to the virtual machine so as to cause the processor to be placed in the first state and supplying power at least one and less than all of the processors in the third state so as to cause the at least one and less than all of the processors to be placed in the second state, and maintaining a remaining one or more of the processors in the third state, wherein the plurality of processors includes type 1 processors and type 2 processors having a lower processing capability and a lower power consumption than the type 1 processors, and for each virtual machine allocated to either type of processors between the type 1 processors and the type 2 processors, when processing of the virtual machine satisfies a predetermined condition the allocation step reallocates the virtual machine satisfying the predetermined condition to one of the other type of processors.

* * * * *